United States Patent
Lyu

(10) Patent No.: US 7,123,579 B1
(45) Date of Patent: Oct. 17, 2006

(54) METHOD OF TRANSMITTING NON-ORTHOGONAL PHYSICAL CHANNELS IN THE COMMUNICATIONS SYSTEM

(75) Inventor: Dug In Lyu, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 625 days.

(21) Appl. No.: 09/631,941

(22) Filed: Aug. 3, 2000

(30) Foreign Application Priority Data

Aug. 4, 1999 (KR) ................ 1999/32024
Aug. 18, 1999 (KR) ................ 1999/34205

(51) Int. Cl.
*H04Q 7/00* (2006.01)

(52) U.S. Cl. ............... 370/203; 370/329; 370/342; 370/350

(58) Field of Classification Search ........ 370/203–209, 370/328, 329, 335, 342, 350
See application file for complete search history.

(56) References Cited

U.S. PATENT DOCUMENTS

| 5,327,455 A * | 7/1994 | De Gaudenzi et al. ...... 370/207 |
| 5,353,352 A * | 10/1994 | Dent et al. ................ 380/37 |
| 5,509,035 A * | 4/1996 | Teidemann et al. ......... 375/356 |
| 5,930,230 A * | 7/1999 | Odenwalder et al. ....... 370/208 |
| 5,987,014 A * | 11/1999 | Magill et al. ............... 370/335 |
| 6,044,074 A * | 3/2000 | Zehavi et al. .............. 370/350 |
| 6,058,136 A * | 5/2000 | Ganesh et al. ............. 375/130 |
| 6,061,338 A * | 5/2000 | O .............................. 370/335 |
| 6,173,005 B1 * | 1/2001 | Kotzin et al. ............... 375/141 |
| 6,175,587 B1 * | 1/2001 | Madhow et al. ............ 375/148 |
| 6,215,762 B1 * | 4/2001 | Dent .......................... 370/208 |
| 6,324,159 B1 * | 11/2001 | Mennekens et al. ........ 370/203 |
| 6,339,646 B1 * | 1/2002 | Dahlman et al. ........... 380/273 |
| 6,501,788 B1 * | 12/2002 | Wang et al. ................ 375/148 |
| 6,504,830 B1 * | 1/2003 | Ostberg et al. ............. 370/342 |
| 6,519,237 B1 * | 2/2003 | McDonough et al. ....... 370/335 |
| 6,542,484 B1 * | 4/2003 | Ovesjo et al. .............. 370/335 |
| 6,574,205 B1 * | 6/2003 | Sato .......................... 370/335 |
| 6,646,979 B1 * | 11/2003 | Chen et al. ................. 370/208 |
| 2002/0181551 A1 * | 12/2002 | Lee et al. ................... 375/146 |

FOREIGN PATENT DOCUMENTS

DE     693 31 375 T 2     5/1994

OTHER PUBLICATIONS

3GPP2 C.S002-A, Physical Layer Standard for cdma2000 Spread Spectrum Systems, Release A, Jun. 9, 2000, p. 103.

* cited by examiner

*Primary Examiner*—Huy D. Vu
*Assistant Examiner*—Roberta A. Shand
(74) *Attorney, Agent, or Firm*—Fleshner & Kim, LLP

(57) ABSTRACT

A communications system and a method of transmitting physical channels in the communications system. A base station judges whether the orthogonality is effected among the physical channels before transmitting the physical channels. If the physical channels are non-orthogonal as a result of judgement, the base station determines starting points of transmission of the physical channels to be different from one another, and then transmits data to corresponding mobile stations through the physical channels having the different starting points of transmission.

24 Claims, 17 Drawing Sheets

METHOD OF TRANSMITTING NON-ORTHOGONAL PHYSICAL CHANNELS IN THE COMMUNICATIONS SYSTEM

BACKGROUND OF THE INVENTION

1. Field of the Invention

The present invention relates to a method of transmitting non-orthogonal physical channels by a single transmitter in the communications system.

2. Description of the Related Art

In a multiple access mobile communications system, a plurality of physical channels may be transmitted through the same frequency band at the same time. In this case, interference may occur among the physical channels to deteriorate the quality of communications.

In order to prevent the deterioration of the communication quality as above, a method of allocating inherent channelization codes to the respective physical channels is used in a code division multiple access (CDMA) mobile communications system.

In other words, the frequency band of data transmitted through the respective physical channel is spread by multiplying the data by an inherent channelization code allocated to the corresponding physical channel. It means that transmission of the data multiplied by its channelization code (i.e., after being spread) occupies much more frequency bands than transmission of the data as it is since a chip rate, that is a transmission rate of the channelization code, is higher than a bit rate, that is a transmission rate of the data.

Here, a value obtained by dividing the chip rate by the bit rate is called a spreading factor. This spreading factor means the number of the channelization code chips multiplied by a single data bit.

When receiving the data, a receiver multiplies a received signal by an inherent channelization code allocated to a corresponding physical channel to be received, and then integrates the multiplied value for a bit period. That is, the receiver already knows the inherent channelization code of the physical channel that the receiver intends to know.

The channelization code of the physical channel that the receiver intends to know is composed of chips having the value of "−1" or "1".

As described above, if the value of the chip is twice multiplied by the same channelization code, the value always becomes "1", so that the influence due to the channelization code vanishes, and only the data signal component remains in the signal.

Meanwhile, the signal component due to another physical code corresponding to the interference is multiplied by the channelization code in the transmitter, and then is multiplied by another channelization code in the receiver, so that the resultant signal is in the form of a noise because the channelization code is not removed, but the strength of the noise signal is greatly reduced as it passes through an integrator in the receiver.

Especially, in the downlink of the CDMA system, the physical channels are discriminated using an orthogonal variable spreading factor (OVSF) codes which are the mutually orthogonal channelization codes. The OVSF code serves to make the physical channel signals mutually orthogonal after spreading irrespective of data values among timing-synchronous physical channels or the spreading rate of the physical channels.

In case that the physical channels are mutually orthogonal, no interference occurs among the signals transmitted from the same transmitter through the same path, and a large number of physical channels can be transmitted without deterioration of the communication quality.

In a wideband CDMA (W-CDMA) system proposed to support an IMT-2000 service, a scrambling code is used for discriminating base stations or cells. This scrambling code is a code allocated for each base station or cell.

It is assumed that the scrambling code is allocated for each base station. If the number of the physical channels per base station is smaller than the number of the usable OVSF codes, it is preferable that one scrambling code is used for one base station. However, If the number of the physical channels per base station is larger than the number of the usable OVSF codes, a plurality of scrambling codes should be used. In case of using a plurality of scrambling codes, an orthogonality is effected among the physical channels using the same scrambling code due to the OVSF code, but no orthogonality is effected among the physical channels using different scrambling codes.

A first used scrambling code is named a primary scrambling code, and an additionally used scrambling code is named a secondary scrambling code. A plurality of secondary scrambling codes exists in a base station, and it is assumed that the number thereof is "M".

FIG. 1 is a block diagram illustrating the construction of a spreader in a W-CDMA base station transmitter which is a conventional radio connection device for supporting the IMT-2000 service, and FIG. 2 is a block diagram illustrating the construction of a modulator in the W-CDMA base station transmitter.

Referring to FIGS. 1 and 2, as codes used in the W-CDMA base station transmitter exist the channelization code and the scrambling code (based on the bibliography; 3GPP RAN 25.213, v2.1.0 (1999-04) spreading and Modulation (FDD)).

The channelization code is inherently allocated for the physical channel, and the base station uses one primary scrambling code and M secondary scrambling code.

First, a spreading process will be explained.

The physical channel is composed of a dedicated physical data channel (DPDCH) and a dedicated physical control channel (DPCCH). The signal of the physical channel is divided into an I-channel branch signal and a Q-channel branch signal by a serial-to-parallel converter, and the I-channel and Q-channel branch signals are multiplied by the OVSF code of the corresponding physical channel through mixers to be spread.

The spread I-channel branch signals and the spread Q-channel signals are summed by an I-channel branch signal summer and a Q-channel branch signal summer, respectively. The summed Q-channel branch signal is converted into an imaginary number through an imaginary number converter, and then the converted imaginary number and the summed I-channel branch signal are combined into a complex number through a complex combiner. This complex number is complex-valued-scrambled by a specified complex-valued scrambling code in a mixer.

Next, a modulation process will be explained with reference to FIG. 2.

The signals complex-valued-scrambled by the scrambling codes whose number is M+1 are summed together by a complex summer, and the summed signal is divided into a real part and an imaginary part. The real part signal and the imaginary part signal pass through pulse modulation function sections, and are multiplied by $\cos\omega t$ and $-\sin\omega t$, respectively. Finally, the multiplied signals are summed by a summer to be transmitted through an antenna.

As shown in FIGS. 1 and 2, when the base station transmits the signals, a timing synchronization is effected among the physical channels, and there exists no difference among starting points of chip transmission for the respective physical channels. FIG. 3 shows the difference among starting points of chip signals of the respective physical channels in the conventional W-CDMA base station transmitter.

FIG. 4 is a block diagram illustrating the construction of a demodulator in the conventional W-CDMA base station receiver. The demodulation process performed thereby is as follows.

The signal received through a mobile station receiver antenna is divided into two signals, and the divided signals are multiplied by $\cos\omega t$ and $\sin\omega t$, respectively. The multiplied signals are converted into digital signals, and the digital signals pass through a same chip-matched filter. Then, the signal component multiplied by $\sin\omega t$ passes through an imaginary number converter to be converted into an imaginary number. The imaginary number outputted from the imaginary number converter and the signal component multiplied by $\cos\omega t$ are combined into a complex number through a complex combiner. The complex number outputted from the complex combiner, which is a signal in the unit of a sample, is converted into a signal in the unit of a chip through an under-sampling block. The signal outputted from the under-sampling block is used as an input of despreaders of all scrambling codes. Specifically, since the W-CDMA base station transmits the physical channels which have no difference of starting points of chip transmission irrespective of the scrambling codes (i.e., existence/nonexistence of mutual orthogonality) used by all the physical channels, it is not required for the W-CDMA mobile station receiver to separately match the starting points of chip transmission for respective physical channels.

As described above, in case that the physical channels are synchronous in timing, the orthogonality can be effected among the physical channels having the same scrambling code due to the property of the OVSF code.

In order to synchronize the physical channels in timing, the starting points of chip transmission of the physical channels should be identical. However, the orthogonality cannot be effected among the physical channels having different scrambling codes even if they are synchronous in timing (i.e., they have the same starting point of chip transmission). Further, in case that the physical channels have the same starting point of chip transmission as in the related art, even the physical channels having no orthogonality have the same starting point of chip transmission, and this causes the interference among the physical channels having no orthogonality to become greatest (M. B. Pursley, "Performance evaluation of phase-coded spread-spectrum multiple-access communication-part I: system analysis," IEEE Trans. Commun. Vol. COM-25, no. 8, August 1977, pp. 795–799).

There also exists the problem that the interference among the physical channels having no orthogonality becomes great in a cdma2000 system having the standard different from that of the W-CDMA system and supporting the IMT-2000 service. In the downlink of the cdma2000 spread spectrum system for supporting the IMT-2000 service, the physical channels are discriminated using a Walsh function which corresponds to channelization codes orthogonal with one another.

This Walsh function serves to make the physical channel signals mutually orthogonal after spreading irrespective of data values among timing-synchronous physical channels or the spreading rate of the physical channels.

In case that the physical channels are mutually orthogonal, no interference occurs among the signals transmitted from the same transmitter through the same path, and a large number of physical channels can be transmitted without deterioration of the communication quality.

Also, in the cdma2000 spread spectrum system, a quasi-orthogonal function (QOF) is used in addition to the Walsh function. The Walsh function is used if the number of physical channels per cell is smaller than the number of usable Walsh functions, while the quasi-orthogonal function (QOF) is used if the number of physical channels per cell is larger than the number of usable Walsh function.

Three quasi-orthogonal functions (QOFs) are defined (Refer to 3GPP2 C. S0002-A, Physical Layer Standard for cdma 2000 Spread Spectrum Systems, Release A.). Here, if the Walsh function it self is considered as a quasi-orthogonal function, the number of the quasi-orthogonal functions becomes four, and hereinafter, it is considered that the number of the quasi-orthogonal functions is four.

In the event that a plurality of quasi-orthogonal functions are used as the channelization codes in a cell, the orthogonality is effected among the equal quasi-orthogonal functions, and no interference occurs among the physical channels using the equal quasi-orthogonal functions as their channelization codes. However, no orthogonality is effected among the different quasi-orthogonal functions, and this causes the interference to occur among the physical channels using the different quasi-orthogonal functions.

FIG. 5 is a block diagram of a transmitting device of the conventional cdma2000 system. In FIG. 5, a transmitting device of a base station in the conventional cdma2000 system is illustrated.

Referring to FIG. 5, the transmitting device comprises a first mixer 100 for generating a channelization code by multiplying a Walsh function by a sign of a quasi-orthogonal function, spreaders 110 and 111 for spreading an input I-channel signal and Q-channel signal by multiplying them by the channelization code, respectively, a rotator 120 for rotating the spread I-channel signal and Q-channel signal on an I plane and a Q plane, respectively, in accordance with a Walsh rotation value, a complex multiplier 130 for complex-multiplying the I-channel signal and the Q-channel signal outputted from the rotator 120 by multiplying the I-channel signal and the Q-channel signal by a pseudo noise code, and a modulator 150 for modulating the I-channel signal and the O-channel signal outputted from the complex multiplier 130 by multiplying the I-channel signal and the Q-channel signal by a carrier.

Here, the spreader 110 comprises a second mixer 111 for spreading the I-channel signal by multiplying the I-channel signal by the generated channelization code, and a third mixer 112 for spreading the Q-channel signal by multiplying the Q-channel signal by the generated channelization code.

The complex multiplier 130 comprises a fourth mixer 131 for multiplying the I-channel signal outputted from the rotator 120 by the pseudo noise code of the I channel, a fifth mixer 132 for multiplying the I-channel signal outputted from the rotator 120 by the pseudo noise code of the Q channel, a sixth mixer 133 for multiplying the Q-channel signal outputted from the rotator 120 by the pseudo noise code of the I channel, a seventh mixer 134 for multiplying the Q-channel signal outputted from the rotator 120 by the pseudo noise code of the I channel, a first combiner 135 for summing an output signal of the fourth mixer 131 and an output signal of the sixth mixer 133, and a second combiner 136 for summing an output signal of the fifth mixer 132 and an output signal of the seventh mixer 134.

The operation of the transmitting device of the conventional communication system as constructed above will new be explained.

The respective physical channel is composed of an I-channel branch signal $X_I$ and a Q-channel branch signal $X_Q$. Then, the I-channel branch signal and the Q-channel branch signal are spread by being multiplied by the channelization codes of the corresponding physical channels, respectively, as they pass through the mixers 111 and 112.

The respective channelization code is generated by multiplying the Walsh function by the sign of the quasi-orthogonal function (QOF) $QOF_{sign}$. The I-channel branch signal $I_{in}$ and the Q-channel branch signal $Q_{in}$ rotate by 0° or 90° on the I and Q planes by the Walsh rotation value $Walsh_{rot}$ in the rotator 120.

Thereafter, the I-channel branch signal and the Q-channel branch signal are complex-multiplied by a pseudo random code $PN_I + jPN_Q$ in the complex multiplier 130. After the complex multiplication, a real output value I and an imaginary output value Q pass through baseband filters 140 and 141, respectively, and then modulated to a carrier frequency in the modulator 150.

Here, the Walsh sign $QOF_{sign}$, and the Walsh rotation value $Walsh_{rot}$ for generating the quasi-orthogonal function QOF are presented in the following Table 1.

TABLE 1

| Index (QOF) | Hexadecinal expression of $QOF_{sign}$ | $W_n^N$ ($Walsh_{rot}$) |
|---|---|---|
| 0 | 00000000000000000000000000000000 00000000000000000000000000000000 | $W_0^{256}$ |
| 1 | 7228d7724eebebb1eb4eb1ebd78d8d28 278282d81b41be1b411b1bbe7dd8277d | $W_{130}^{256}$ |
| 2 | 114b1e4444e1ebeeee4de144bbe1b4ee dd872d77882d78dd2287d277772d87dd | $W_{173}^{256}$ |
| 3 | 1724bd71b28118d48ebddb172b187ebe2 e7d4b27ebd8ee82481b88be7dbe871bd | $W_{47}^{256}$ |

In Table 1, $W_n^N$ means a value the length of which is N, and the Walsh code index of which is n. The timing synchronization is effected among all the physical channels transmitted from the base station, and thus there exists no difference of starting points of chip transmission among the physical channels.

The difference of starting points of chip transmission among the respective physical channels in the cdma2000 base station transmitting device is shown in FIG. 6.

Referring to FIG. 6, it can be recognized that the starting points of chip transmission of the respective physical channels are identical. FIG. 7 is a block diagram of a receiving device of a conventional cdma2000 system. In FIG. 7, the receiving device of a mobile station in the conventional cdma2000 system is illustrated.

Referring to FIG. 7, the receiving device of the mobile station comprises a demodulator 300 for demodulating a received signal to a baseband signal by multiplying the received signal by a sine carrier and a cosine carrier, respectively, analog-to-digital converters 303 and 304 for converting demodulated signals onto digital signals, baseband filters 305 and 306 for filtering the respective digital signals outputted from the analog-to-digital converters 305 and 306, and under-sampling blocks 307 and 308 for converting filtered digital signals in the unit of a sample into signals in the unit of a chip, and transmitting the converted signals to a pseudo noise decoder. The numeral "L" denotes the number of samples per chip in the under-sampling blocks 307 and 308.

The operation of the receiving device of the mobile station as constructed above will now be explained.

The signal inputted through a receiving antenna of the mobile station is divided into two signals. The two signals are demodulated into the baseband signals by the demodulators 301 and 302, and then converted into the digital signals by the analog-to-digital converters 303 and 304.

The converted digital signals pass through the baseband filters 305 and 306, converted into the signals in the unit of a chip through the under-sampling blocks 307 and 308, and then transmitted to the pseudo noise code decoder (not illustrated). As described above, in the base station of the cdma2000 system, all the physical channels are transmitted without the difference of starting points of chip transmission irrespective of the index of the quasi-orthogonal function (i.e., existence/nonexistence of the mutual orthogonality) used by the physical channels, it is not required for the receiver of the mobile station of the cdma2000 system to separately match the starting points of chip transmission for the respective physical channels.

As described above, in the cdma2000 system, in case that the physical channels having the same quasi-orthogonal function (QOF) are synchronous in timing due to the property of the Walsh function. Accordingly, in order to synchronize the physical channels in timing, the starting points of chip transmission of the physical channels should be identical.

However, the orthogonality cannot be effected among the physical channels having different quasi-orthogonal functions (QOF) even if they are synchronous in timing (i.e., they have the same starting point of chip transmission).

Further, in case that the physical channels have the same starting point of chip transmission as in the related art, even the physical channels having no orthogonality have the same starting point of chip transmission, and this causes the interference among the physical channels having no orthogonality to increase.

SUMMARY OF THE INVENTION

Accordingly, the present invention is directed to a communications system and a modulation/demodulation method in the communications system that substantially obviates one or more of the problems due to limitations and disadvantages of the related art.

An object of the present invention is to provide a mobile communications system and a modulation/demodulation method in the system capable of reducing the interference among non-orthogonal physical channels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the orthogonal physical channels transmit the chip signal with the same starting point of chip transmission, and the non-orthogonal physical channels transmit the chip signal with different starting points of chip transmission.

According to the present invention, an interference can be reduced if there exists the interference because the orthogonality is not effected among the physical channels transmitted through the same frequency band and at the same time.

In the foregoing description, physical channels having different scrambling codes in the W-CDMA system are exemplified. However, such physical channels may be different, and thus the scope of the present invention covers the physical channels transmitted through the same frequency band and at the same time. However, for the explanation of the effect of the present invention, the physical channels having different scrambling codes are exemplified.

If the present invention is applied to the physical channels having no orthogonality due to the use of the different scrambling codes, the non-orthogonal physical channels transmit the chip signal with different starting points of chip transmission. On the contrary, the physical channels, which use the same scrambling code and have the orthogonality due to the OVSF code, transmit the chip signal with the same starting point of chip transmission.

Meanwhile, according to the present invention, it is assumed that both the base station and the mobile station of the communications system already know the starting points of chip transmission according to the respective scrambling codes. Thus, the mobile station (or mobile stations) matches the receiving time synchronization of the physical channels scrambled with first scrambling codes, and then finds the receiving time synchronization of the physical channels scrambled with second scrambling codes. According to the present invention, in order to find the receiving time synchronization of the physical channels scrambled with the second scrambling codes, it is required to operate a timing synchronization detecting circuit.

Preferably, the time period between the starting points of chip transmission is determined to be shorter than the chip duration, and to be a value that minimizes the interference for all the physical channels. Here, the chip duration is a value of a reciprocal of the chip rate.

In the cdma2000 system to which the present invention is applied, the physical channels, which use the same quasi-orthogonal function (QOF) and have the orthogonality due to the Walsh function, transmit the chip signal with the same starting point of chip transmission, while the physical channels, which use different QOF and have the non-orthogonality, transmit the chip signal with the different starting points of chip transmission.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
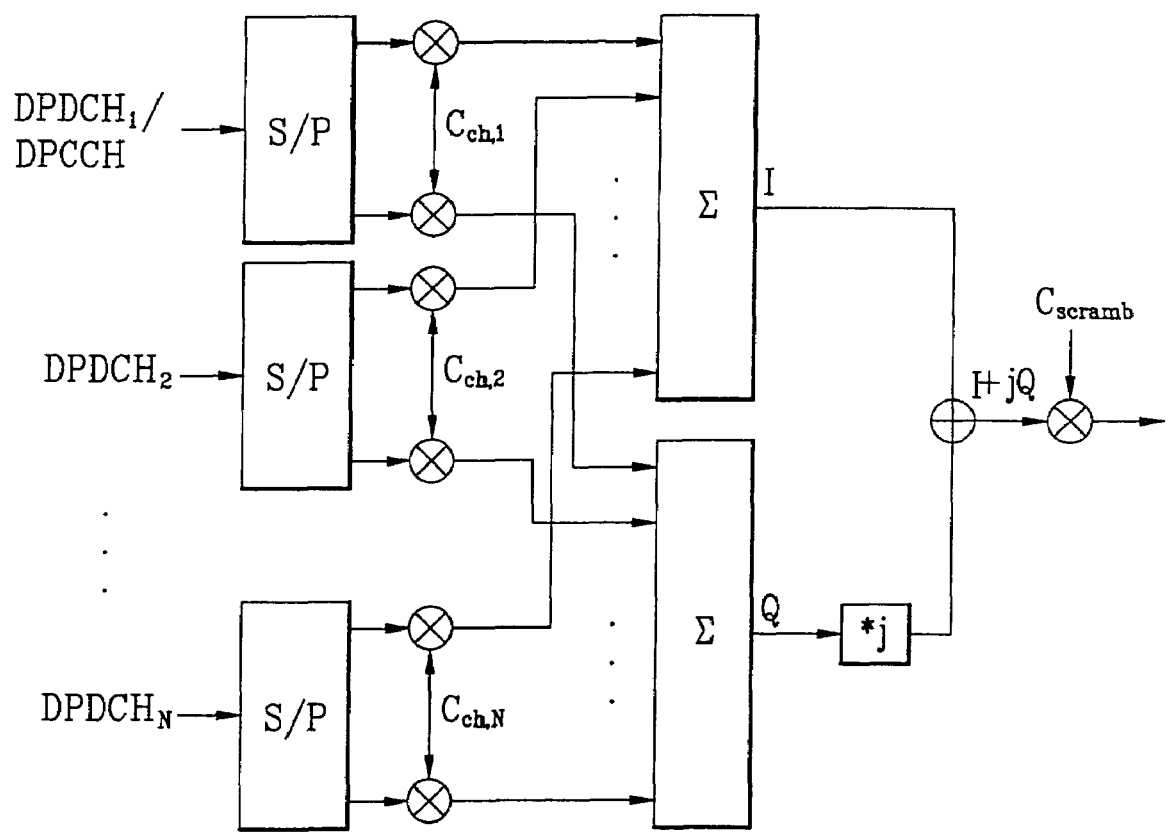
FIG. 1 is a block diagram illustrating the construction of a spreader in a conventional W-CDMA base station transmitter.
Figure 2:
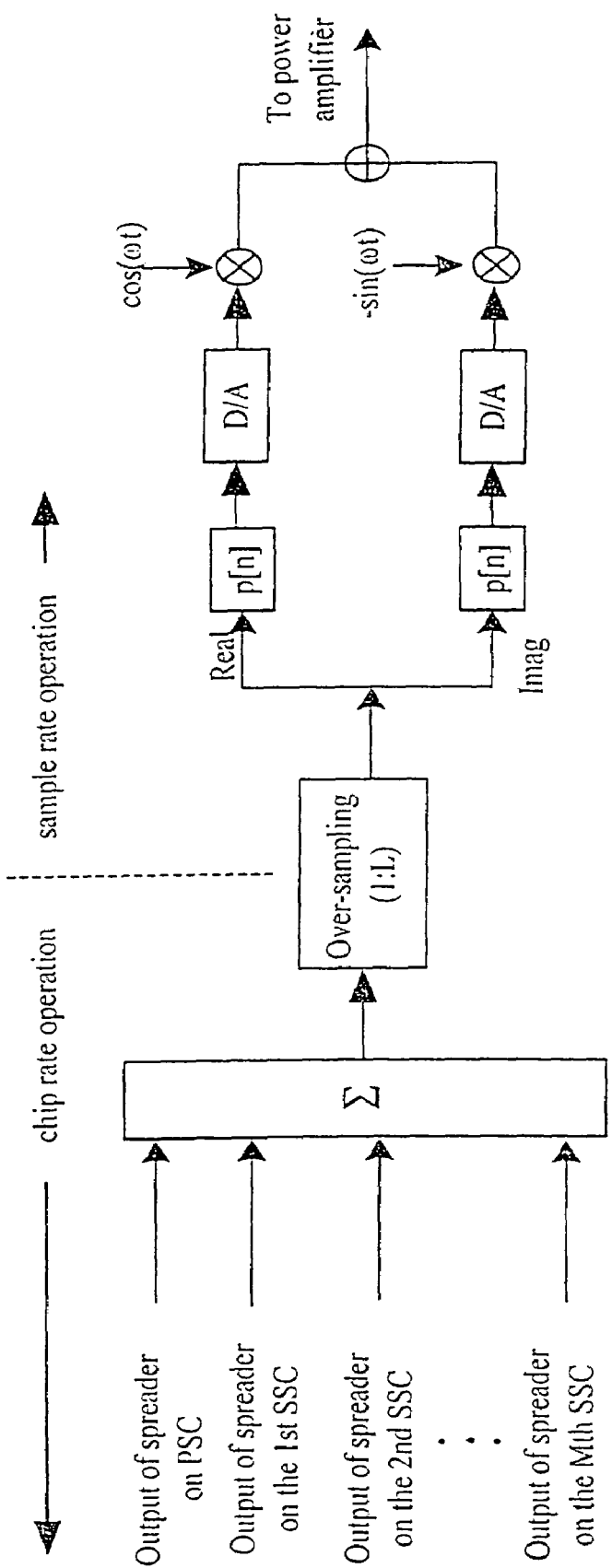
FIG. 2 is a block diagram illustrating the construction of a modulator in the conventional W-CDMA base station transmitter.
Figure 8:
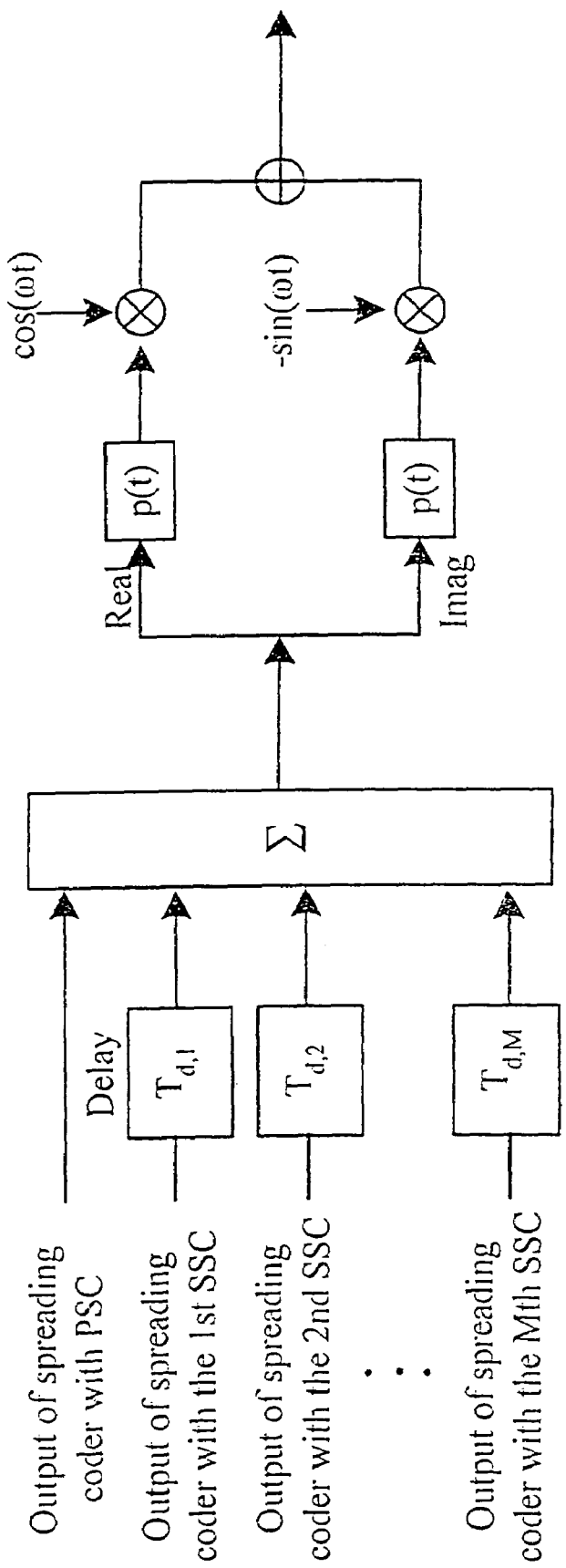
FIG. 8 is a block diagram illustrating the construction of a modulator in a base station transmitter according to the present invention.

First, in case of the W-CDMA system, the spreader in the base station transmitter according to the present invention is identical to that in the conventional W-CDMA base station transmitter of FIG. 1. FIG. 8 is a block diagram illustrating the construction of a modulator in the base station transmitter according to the present invention.

The spreading process of the present invention is also identical to the conventional spreading process. The modulation process according to the present invention will now be explained.

Figure 3:
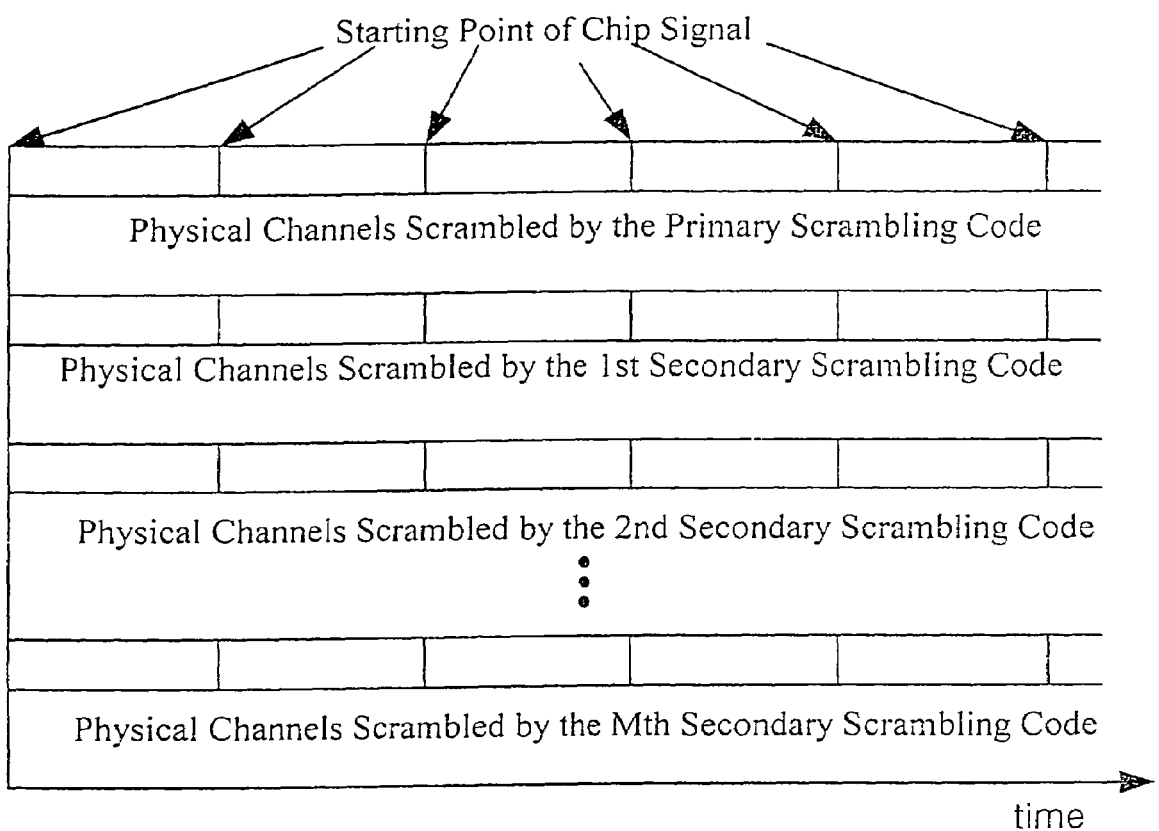
FIG. 3 is a view illustrating the difference among the starting points of chip transmission of the respective physical channels in a conventional W-CDMA base station transmitter.
Figure 4:
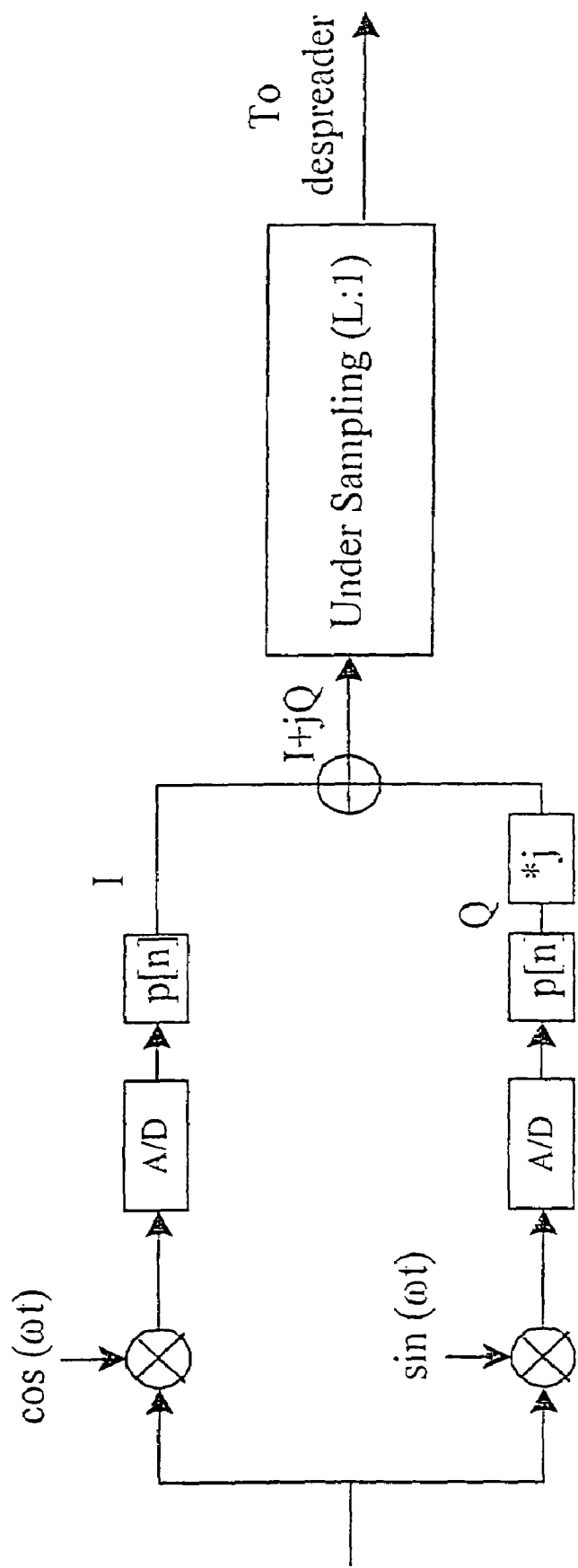
FIG. 4 is a block diagram illustrating the construction of a demodulator in a conventional W-CDMA mobile station receiver.

According to the present invention, the physical channels scrambled with respective scrambling codes are transmitted through the modulator of FIG. 3. Specifically, all the physical channels scrambled with the first scrambling code and second scrambling codes the number of which is M are summed together in the same base station, and the summed value is divided into a real part and an imaginary part. At this time, outputs of spreaders using the second scrambling codes pass through corresponding delays before they are summed by a summer. That is, the physical channels, which have different scrambling codes, have different starting points of chip transmission. Then, the real part of the output of the summer is multiplied by a cosine function, and the imaginary part of the output of the summer is multiplied by a negative sine function. The outputs of the multipliers are summed together to be transmitted through the antenna.

Figure 9:
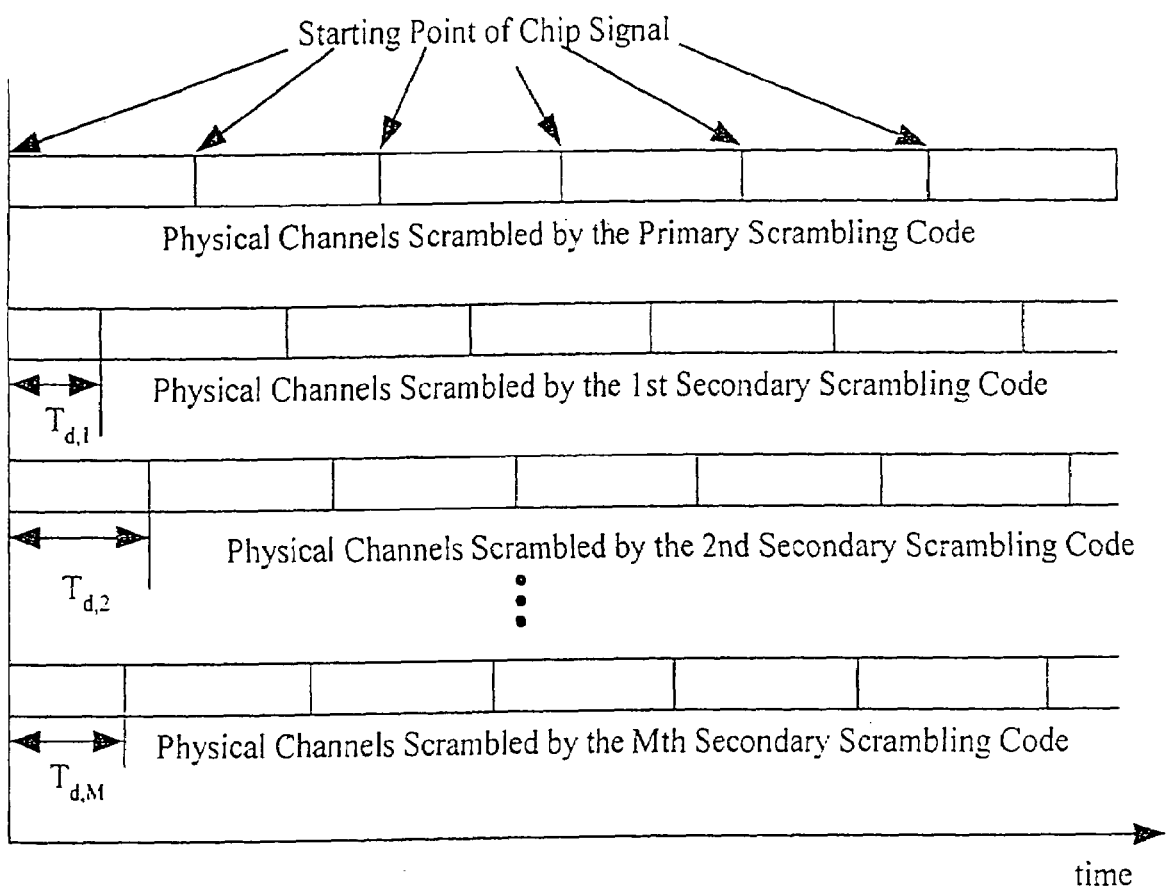
FIG. 9 is a view illustrating the starting points of chip transmission of the respective physical channels according to the present invention.

FIG. 9 is a view illustrating the starting points of chip transmission of the respective physical channels according to the present invention. As shown in FIG. 9, the physical channels having the same scrambling code are transmitted with the same starting point of chip transmission, and the physical channels having different scrambling codes are transmitted with the different starting points of chip transmission.

Preferably, the time period among the starting points of chip transmission is determined to be a value that can minimize the interference for the physical channels scrambled with the different scrambling codes.

In case that the chip duration that is a reciprocal of the chip rate is $T_c$, if it is defined that the difference among starting points of chip transmission between two physical channels is $T_d$ ($0 \leq T_d(T_c)$, and the size of the interference between the two physical channels according to $T_d$ ($0 \leq T_d$ ($T_c$) is $I(T_d)$, $I(T_d)$ can be expressed by the following equation.

$$I(T_d) = \sum_{q=-2}^{c} \left( \int_{eT_c/2}^{eT_c/2} p(t)p(t - qT_c - T_d) dt \right)^2 \quad (1)$$

In equation (1), p(t) is a chip pulse shape function. In the duration of $-eT_c/2 \leq t < eT_c/2$, it has a certain value, and in other duration, it has the value of "0". That is, $eT_c$ represents the length of the duration where the chip pulse shape function has a significant value.

In the mobile communications system, a root-raised cosine (RRC) function is frequently used as the pulse shape function. If it is defined as $RC_0$ (t), it can be expressed by $$RC_0(t) = \frac{\sin\left(\pi(1-\alpha)\frac{t}{T_C}\right) + 4\alpha\frac{t}{T_C} \cdot \cos\left(\pi(1+\alpha)\frac{t}{T_C}\right)}{\pi\frac{t}{T_C}\left(1 - \left(4\alpha\frac{t}{T_C}\right)^2\right)}$$

Here, α is a roll-off value in a frequency domain. In equation (2) since $RC_0(t)$ is defined as the value of an infinite time, it is improper to implement it. In order to complement this, p(t) wherein $RC_0(t)$ is limited in time is used as follows.

$$p(t)=RC_0(t), -eT_c/2 \leq t < eT_0/2 p(t)=0, \text{otherwise} \quad (3)$$

In equation (3), $eT_c$ represents the length of the duration where the chip pulse shape function has a significant value. If the value of $eT_c$ is infinite, the equation (3) becomes the same as the equation (2). Thus, the equation (3) is a generalized form of the equation (2).

Figure 7:
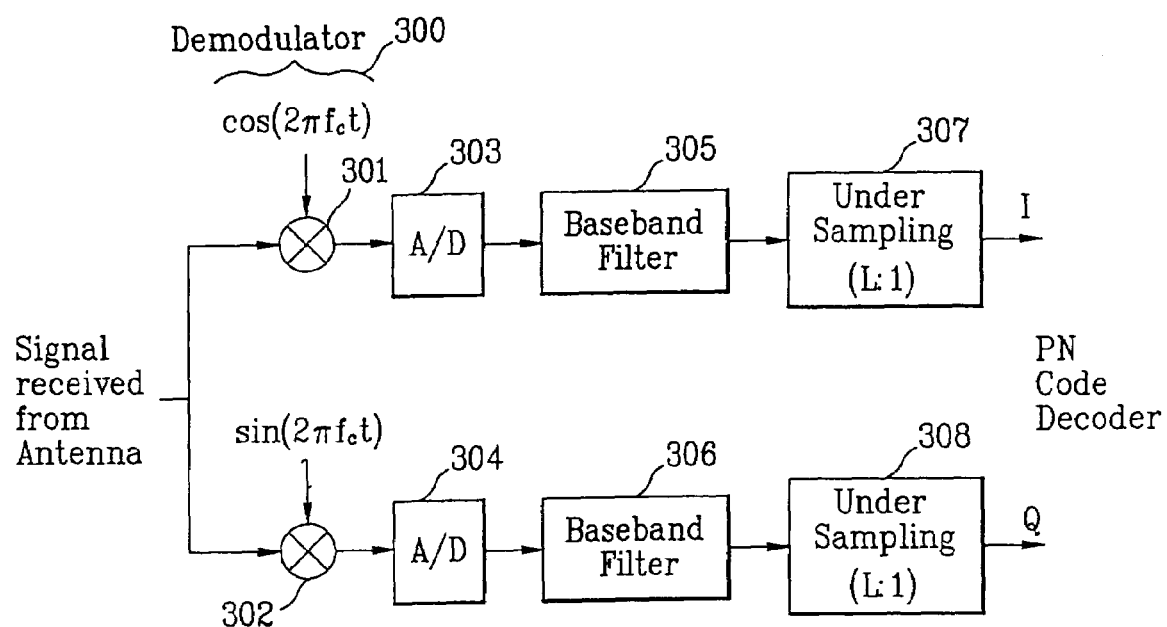
FIG. 7 is a block diagram of a mobile station receiving device in a conventional cdma2000 system.
Figure 10:
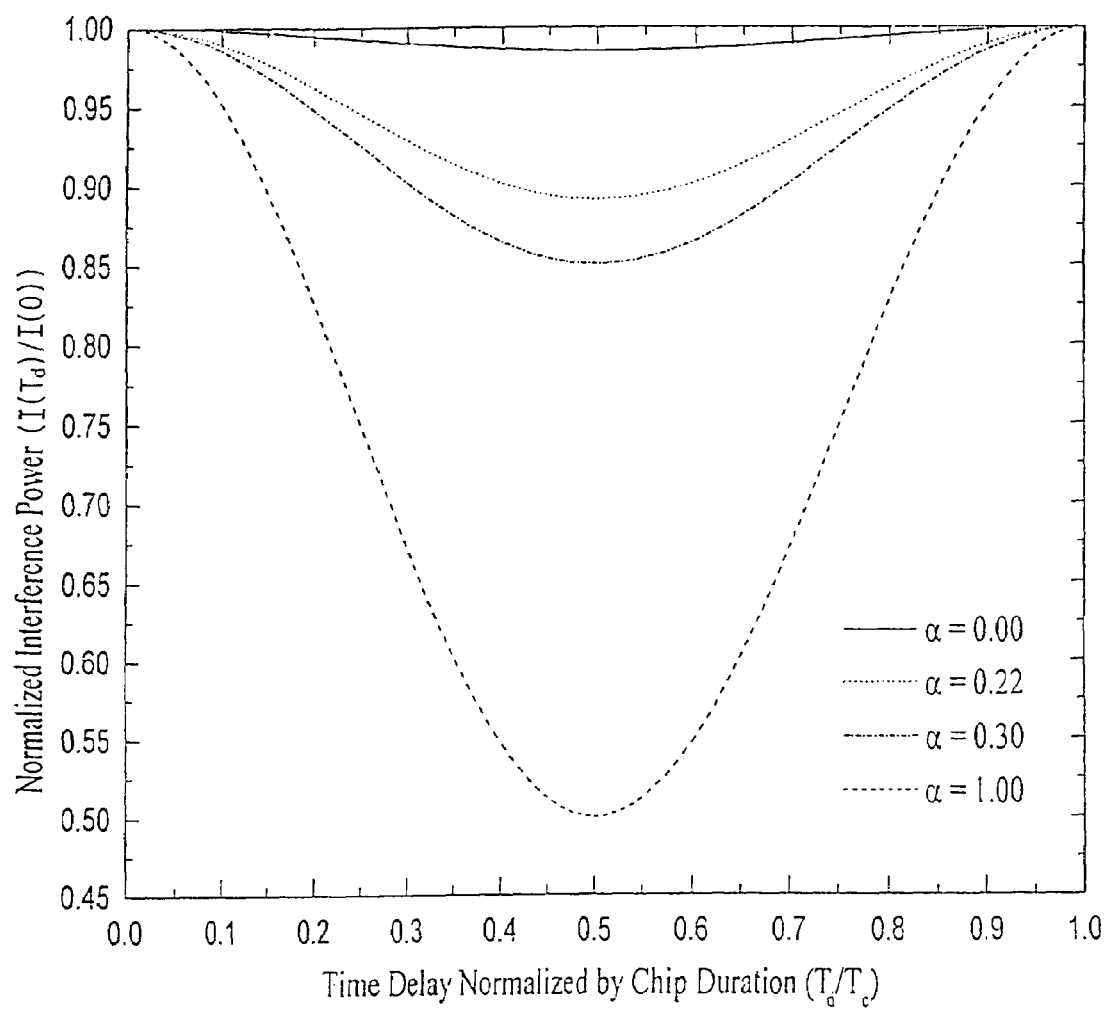
FIG. 10 is a view illustrating the difference among starting points of chip transmission between two physical channels, the size of interference normalized between the two physical channels according to $T_d$ ($0 \leq T_d (T_c)$), and $I(T_d)/I(0)$ in case that a value of α is 0, 0.22, 0.3, and 1.
Figure 11:
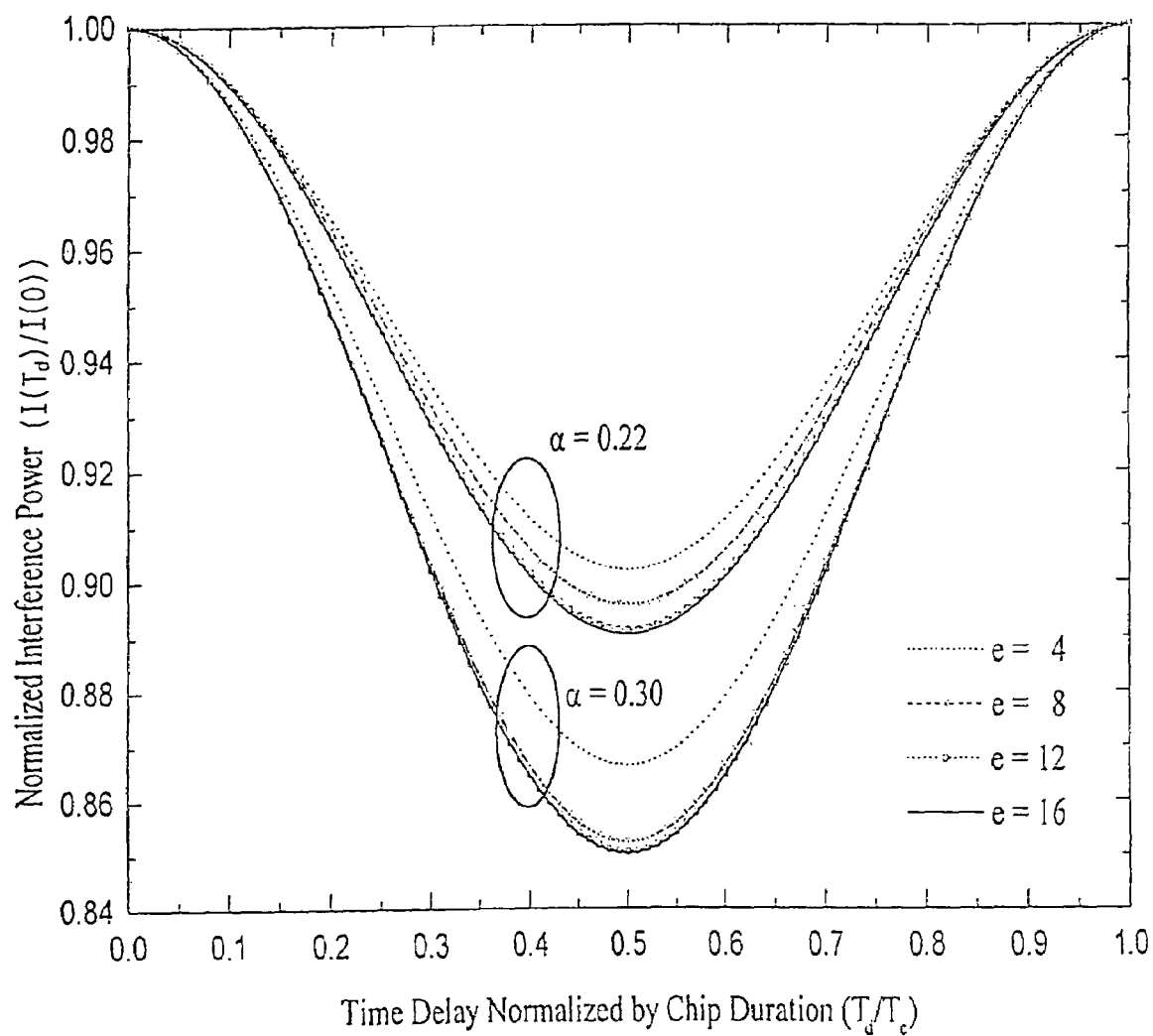
FIG. 11 is a view illustrating the difference among starting points of chip transmission between two physical channels, the size of interference normalized between the two physical channels according to $T_d$ ($0 \leq T_d (T_c)$), and $I(T_d)/I(0)$ in case that a value of e is 4, 8, 12, and 16.

FIGS. 7 and 8 illustrate the difference $T_d$ ($0 \leq T_d(T_c)$ among starting points of chip transmission between two physical channels, and the value $I(T_d)/I(0)$ obtained by normalizing by $I(0)$ the size $I(T_d)$ of the interference between the two physical channels according to the difference $T_d$ ($0 \leq T_d$ ($T_c$) in case that the RRC function of the equation (3) is used as the chip pulse wave function. In FIG. 10, the value of e is determined to be 12, and the value of α is determined to be 0, 0.22, 0.3, and 1. In FIG. 11, the value of e is determined to be 4, 8, 12, and 16, and the value of α is determined to be 0.22 and 0.3. In FIG. 10, the normalized size of the interference $I(T_c/2)/I(0)$ has the value of 0.985, 0.891, and 0.50 if the value of e is 12, and the value of α is 0, 0.22, 0.3, and 1. Also, as shown in FIGS. 10 and 11, the normalized size of interference of two non-orthogonal physical channels has the maximum value when $T_d=0$, and has the minimum value when $T_d=T_c/2$, irrespective of the values of e and α. This is effected not only in case of the RRC function but also in case of other general pulse shape functions.

Based on the result as described above, it can be recognized that the interference can be reduced when the non-orthogonal physical channels are transmitted with the difference of the starting points of chip transmission, rather than without the difference of the starting points of chip transmission. In case that two non-orthogonal physical channels exist, if the number of the scrambling codes is 2, the interval of the starting points of chip transmission that can minimize the interference is the value of half the chip duration (i.e., $T_d=T_c/2$).

In the foregoing description, it is considered that the number of non-orthogonal physical channels is 2, i.e., the number of scrabbling codes used in one base station is 2. Hereinafter, it will be considered that the number of non-orthogonal physical channels, i.e., the number of scrambling codes used in one base station is 3 or more.

One first scrambling code and second scrambling codes the number of which in M are used in one base station. According to the present invention, it is assumed that m is an index of the second scrambling code. Specifically, m has the value in the range of 1 to M, and means the m-th scrambling code among the second scrambling codes. Also, $T_{d,m}$ represents the difference of starting points of chip transmission between the second m-th scrambling code and the first scrambling code. In order to unify the items, the starting point of chip transmission of the first scrambling code is represented as $T_{d,0}$, and is defined as $T_{d,0}=0$.

Preferably, the starting points of chip transmission $T_{d,0}$ ($0 \leq m < M$) are determined as values which minimize the interference with respect to the physical channels scrambled with different scrambling codes.

The total amount of interference of the physical channels scrambled with the first scrambling code and the M second scrambling codes is defined as S, and can be represented by $$T_{d,m} = \frac{g_m T_c}{N}$$

In equation (4), it in assumed that the physical channels scrambled with respective scrambling codes are equal in a viewpoint of power.

In order to easily implement the difference among the starting points of chip transmission in the transmitter of the base station and in the receiver of the mobile station, the value that the difference among the starting points can have is limited as follows, $$S = \sum_{m=0}^{M} \sum_{n=0}^{M} I(|T_{d,m} - T_{d,n}|)$$

Here, $g_m$=0, 1, . . . , and N−1. If the number N of the starting points of chip transmission is 1, $T_{d,m}$=0, which is the same as in the conventional method. If N=2, $T_{d,m}$ has the value of 0 or $T_c/2$, and if N=4, $T_{d,m}$=0 has the value of 0, $T_c/4$, $T_c/2$, and 3 $T_c/4$. Also, if N has the infinite value, the limitation of the value that the difference among the starting points of chip transmission can have will disappear.

In equation (5), if N is a divisor of the value L of the over-sampling ratio (i.e., sample rate/chip rate) of the base station transmitter and the mobile station receiver, the difference $T_{d,m}$ of the starting points of chip transmission means the sample delay of $(g_m L)/N$, causing the hardware implementation to become easy.

Figure 12:
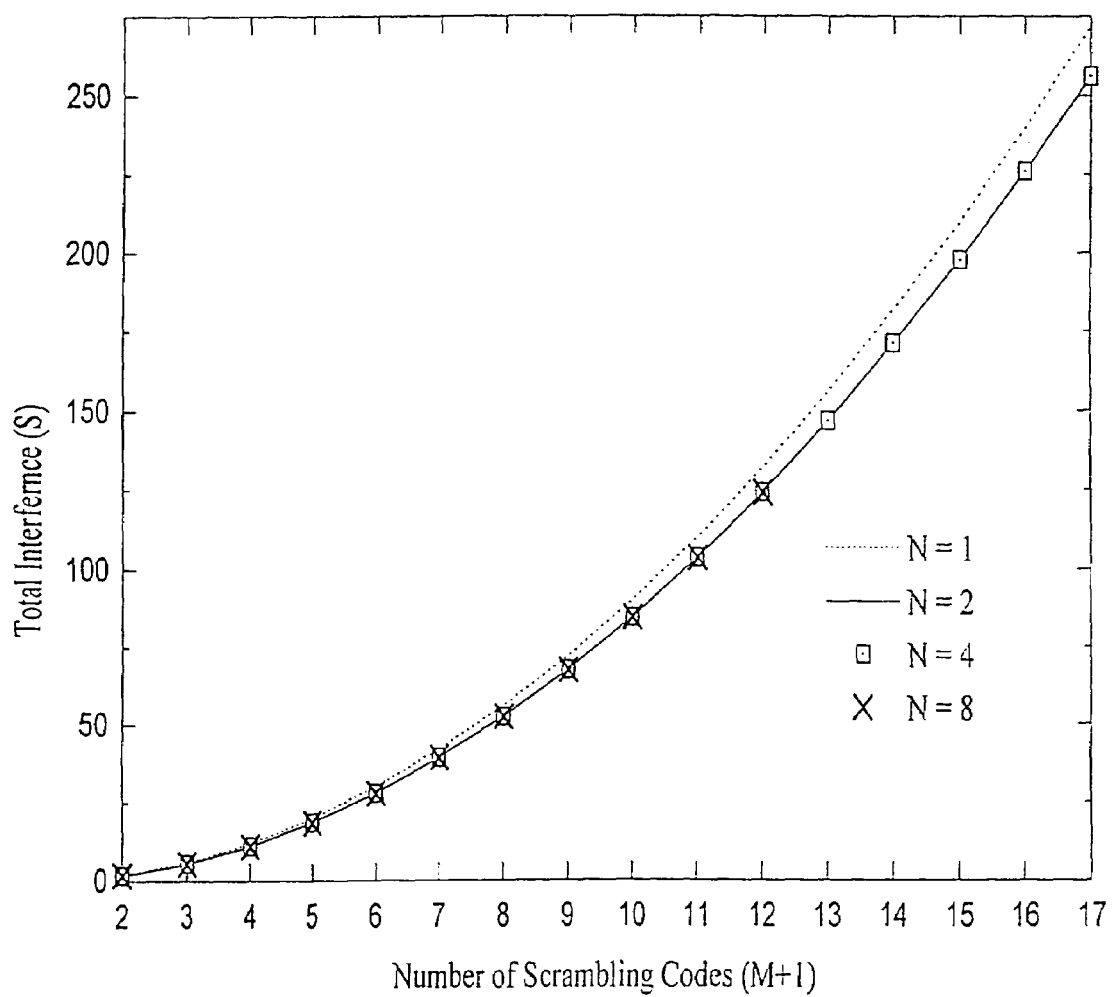
FIG. 12 is a view illustrating the amount of whole interference among the physical channels in case of using the scrambling codes the number which is M+1 when α=0.22.
Figure 13:
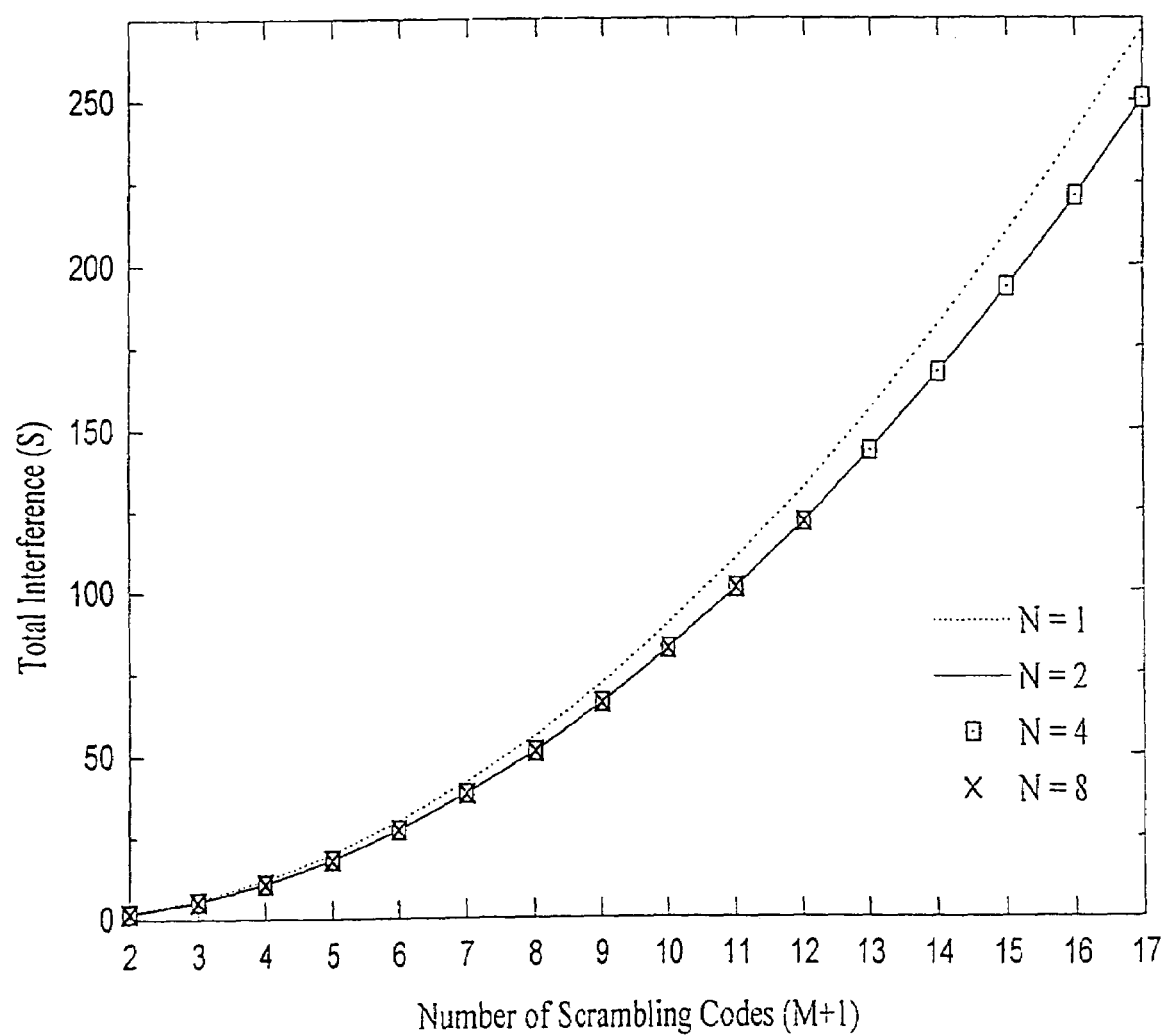
FIG. 13 is a view illustrating the amount of whole interference among the physical channels in case of using the scrambling codes the number which is M+1 when α=0.30.

FIGS. 12 and 13 illustrate the total amount S of interference according to a given value of M, and the difference $T_{d,m}$ (0≦m<M) of the starting points of chip transmission that minimizes the value of S, obtained considering all the cases. FIG. 12 shows the case of α=0.22, and FIG. 13 shows the case of α=0.3. In FIGS. 12 and 13, the value of N is 1, 2, 4, and 8. As shown in FIGS. 12 and 13, as the value of N increases from 1 to 2, the total amount of interference is remarkably decreased, but as the value of N increases from 2 to 8, the total amount of interference is insignificantly decreased. Also, since the sampling rate is always a multiple of the chip rate, the determination of N=2 makes the hardware implementation of the difference of the starting points of chip transmission easy. Also, the case of limiting the value that the transmission time delay can have to 0 or $T_c/2$ has almost no difference in performance in comparison to the case of not limiting the value.

This is proved by calculating the total amount of interference in the equation (4) with respect to the following three cases. The first case is the case that no transmission time delay exists. In other words, $T_{d,m}$=0, m=0, 1, . . . , M. The second case is the case that the transmission time delay $T_{d,m}$ is 0 or $T_c/2$. As described above, this case imposes smallest additional burden in hardware. The third case is the case that the transmission time delay $T_{d,m}$ is a multiple of $T_c/N$. Here, if the value of N is infinite, $T_{d,m}$ has the successive value in the range of 0 to $T_c$. However, as the value of N becomes larger, the time required for obtaining the value of S in the equation (4) with respect to the difference of all possible transmission time is increased in geometrical series. Thus, according to the present invention, N=100 is used in demonstration.

With respect to the above-described three cases, the transmission time delay $T_{d,m}$, m=0, 1, . . . , M, which minimizes the total amount of interference in the equation (4), and the total amount S of interference are obtained and shown in the following Table 2.

TABLE 2

Transmission time delay and total amount of interference

| | First case | | Second case | | Third case | |
|---|---|---|---|---|---|---|
| M | $T_{d,m}$, m = 1, 2, . . . , M | Total amount of interference, S1 | $T_{d,m}$, m = 1, 2, . . . , M | Total amount of interference, S2 | $T_{d,m}$, m = 1, 2, . . . , M | Total amount of interference, S3 |
| 1 | 0, 0 | 1.999414 | 0, 0.5$T_q$ | 1.781533 | 0, 0.5$T_d$ | 1.781533 |
| 2 | 0, 0, 0 | 5.998243 | 0, 0.5$T_a$, 0 | 5.562479 | 0, 0.34$T_a$, 0.67$T_e$ | 5.508074 |
| 3 | 0, 0, 0, 0 | 11.996485 | 0, 0.5$T_a$, 0, 0.5$T_e$ | 11.124959 | 0, 0.25$T_o$, 0.5$T_q$ 0.75$T_a$ | 11.124930 |
| 4 | 0, 0, 0, 0, 0 | 19.994142 | 0, 0.5$T_q$, 0, 0.5$T_a$, 0 | 18.686852 | 0, 0.2$T_a$, 0.4$T_c$ 0.6$T_q$, 0.8$T_d$ | 18.632322 |
| 5 | 0, 0, 0, 0, 0, 0 | 29.991213 | 0, 0.5$T_a$, 0, 0.5$T_q$, 0, 0.5$T_o$ | 28.030278 | 0, 0.15$T_c$, 0.31$T_q$, 0.55$T_a$, 0.60$T_n$, 0.84$T_a$ | 28.030186 |

In Table 2, it is defined that the total amounts of interference for the three cases are S1, S2, and S3. As shown in Table 2, it can be recognized that the total amount of interference is reduced by 6.5% to 10.9% in case of having the transmission time delay (the second and third cases) in comparison to the case having no transmission time delay. However, comparing the case that the value which the transmission time delay can have is limited (the second case) with the case that the value is not limited (the third case), the difference of the total amount of interference becomes insignificant, i.e., less than 1%, as shown in Table 3 as below.

TABLE 3

Comparison of interference ratios for the respective cases

| M | S2/S1 | S3/S1 | S3/S2 |
|---|---|---|---|
| 2 | 0.891 | 0.891 | 1.000 |
| 3 | 0.927 | 0.918 | 0.990 |
| 4 | 0.927 | 0.927 | 1.000 |
| 5 | 0.935 | 0.932 | 0.997 |
| 6 | 0.935 | 0.935 | 1.000 |

As shown in Table 3, even if the value that the transmission time delay can have is limited, the deterioration of performance caused thereby is very immaterial.

Specifically, the total amount of interference can be reduced by differently determining the differences of the starting points of chip transmission of the physical channels for each scrambling code. According to the present invention, it is preferable that the number of start points of chip transmission is determined to be N=2, considering the improvement of performance and the easiness of implementation.

In the W-CDMA system, the maximum number of scrambling codes is fixed to be M, but the number of scrambling codes actually used is changed. Thus, it is impractical to change the chip transmission time of all the physical channels according to the number of scrambling codes actually used and changed. According to the present invention, the starting point of chip transmission of the physical channel of the respective scrambling code, $T_{d,m}$, m=0, 1, . . . , M, is determined to have the value of 0 or $T_c/2$.

Hereinafter, the method of determining the starting point of chip transmission of the respective physical channel, considering the operating situation of the system will be explained.

As described above, if the receiving powers of the physical channels of the respective scrambling codes are identical in all the base stations, the transmission time delay at that time is determined to be $T_{d,m}=T_c/2$ in case that m is an odd number, while it is determined to be $T_{d,m}=0$ in case that m is an even number. This means that the interference of the physical channels is minimized by determining the strength of the receiving power whereby the value of the starting point of chip transmission is 0 to be equal to the strength of the receiving power whereby the value of the starting point of chip transmission is a half chip in the mobile station. This case is defined as situation 1, and the value of the starting point of chip transmission at this time is represented in the following Table 4.

TABLE 4

Determination of transmission time delay in various states

| | Td, m | | |
|---|---|---|---|
| m | States 1 and 4 | States 2 | States 3 |
| 0 | 0 | 0 | 0 |
| 1 | 0.5Tc | 0.5Tc | 0.5Tc |
| 2 | 0 | 0.5Tc | 0.5Tc |
| 3 | 0.5Tc | 0 | 0.5Tc |
| 4 | 0 | 0.5Tc | 0.5Tc |
| 5 | 0.5Tc | 0 | 0.5Tc |
| 6 | 0 | 0.5Tc | 0.5Tc |
| 7 | 0.5Tc | 0 | 0.5Tc |

At this time, in the actual system, there exist synchronization channels in addition to the scrambled physical channels. Since this synchronization channel is transmitted at the same time as the first scrambling code, the strength of the receiving power whereby the starting point of chip transmission has the value of 0 is greater than the strength of the receiving power of other starting points of chip transmission. Generally, if it is defined that the sum of powers of the physical channels scrambled with a scrambling code, and the sum of powers of the synchronization channels in K, the relationship of P>K is effected. In this case, it is preferable to determine the transmission time delay so that the strength of the receiving power whereby the value of the starting point of chip transmission is 0 is equal to the strength of the receiving power whereby the value of the starting point of chip transmission is a half chip in the mobile station. Specifically, when the value of the starting point of chip transmission of the first-coming second scrambling code is newly determined, the sum of the mobile station receiving power of the physical channels whereby the value of the starting point of chip transmission is 0 becomes P+K, which is the sum of the powers of the physical channels scrambled with the first scrambling code and the synchronization channels, and the receiving power whereby the value of the starting point of chip transmission corresponds to the half chip duration becomes 0. Accordingly, the starting point of chip transmission of the first-coming second scrambling code is determined to be the half chip duration. In determining the starting point of chip transmission of the second-coming second scrambling code, since the receiving power whereby the starting point of chip transmission is 0 is P+K, and the receiving power whereby the starting point of chip transmission corresponds to the half chip duration is P, the starting point of chip transmission of the second-coming second scrambling code is determined to be the half chip. In determining the starting point of chip transmission of the third-coming second scrambling code, since the receiving power whereby the starting point of chip transmission is 0 is P+K, and the receiving power whereby the starting point of chip transmission corresponds to the half chip duration is 2P, the starting point of chip transmission of the third-coming second scrambling code is determined to be 0. In the same manner as described above, the starting point of chip transmission of the fourth-coming second scrambling code can be determined. A situation 2 corresponds to the case that the strength of the receiving power corresponding to the starting point of chip transmission of the first scrambling code is great, and the starting point of chip transmission of the scrambling code at this time is shown in Table 4. The situation 2 has the advantages that the performance of the first scrambling code is slightly improved in comparison to the situation 1. Accordingly, it is preferable to use the situation 2 in case that the importance of the physical channel or synchronization channel of the first scrambling code is high, and to use the situation 1 otherwise.

In the foregoing description, it is assumed that the receiving powers of the physical channels of the respective scrambling codes are equal in all the mobile stations. However, if the antenna of the base station is directional and the directivity of the transmission power in a specified region of the whole cell is different from that of the remaining region for each scrambling code, the reception power of the physical channel for each scrambling code, which is received in the respective terminal receiver may be different. Specifically, it is assumed that the physical channel of the first scrambling code is transmitted from the base station antenna with the same power for all the cell region. Also, it is assumed that the physical channels of the second scrambling codes are transmitted from the base station antenna with a large power, being not superimposed on the specified region of the cell. In the mobile station located in the cell only the physical channel of the first scrambling code and the physical channels of the second scrambling codes will be received. This case is defined as a situation 3. As shown in Table 4, the performance of the present invention can be maximized by making the transmission time delay of the second physical channels in the situation 3 have the half chip duration and thus making the reception powers corresponding to the values of the starting points of chip transmission in the mobile station equal.

The three situations described in Table 4 are performed on the assumption that the physical channels of the (m+1)-th second scrambling code are necessarily used after all the physical channels of the m-th second scrambling code.

However, there may exist a situation where it is not necessarily required to follow the above-described order in the system, and this situation is defined as a situation 4 according to the present invention. After the base station has used all the physical channels of the m-th second scrambling code, it may use the physical channels of the scrambling code which has the corresponding starting point of chip transmission among the second scrambling codes that have not yet been used, rather than use the physical channels of the next (m+1)-th scrambling code.

The base station may inform the mobile station of the difference among the starting points of chip transmission of the respective scrambling codes by signaling. Also, as another method, the difference among the starting points of chip transmission which corresponds to the respective scrambling code is pre-defined, and stored in the base station and the mobile station.

Figure 14:
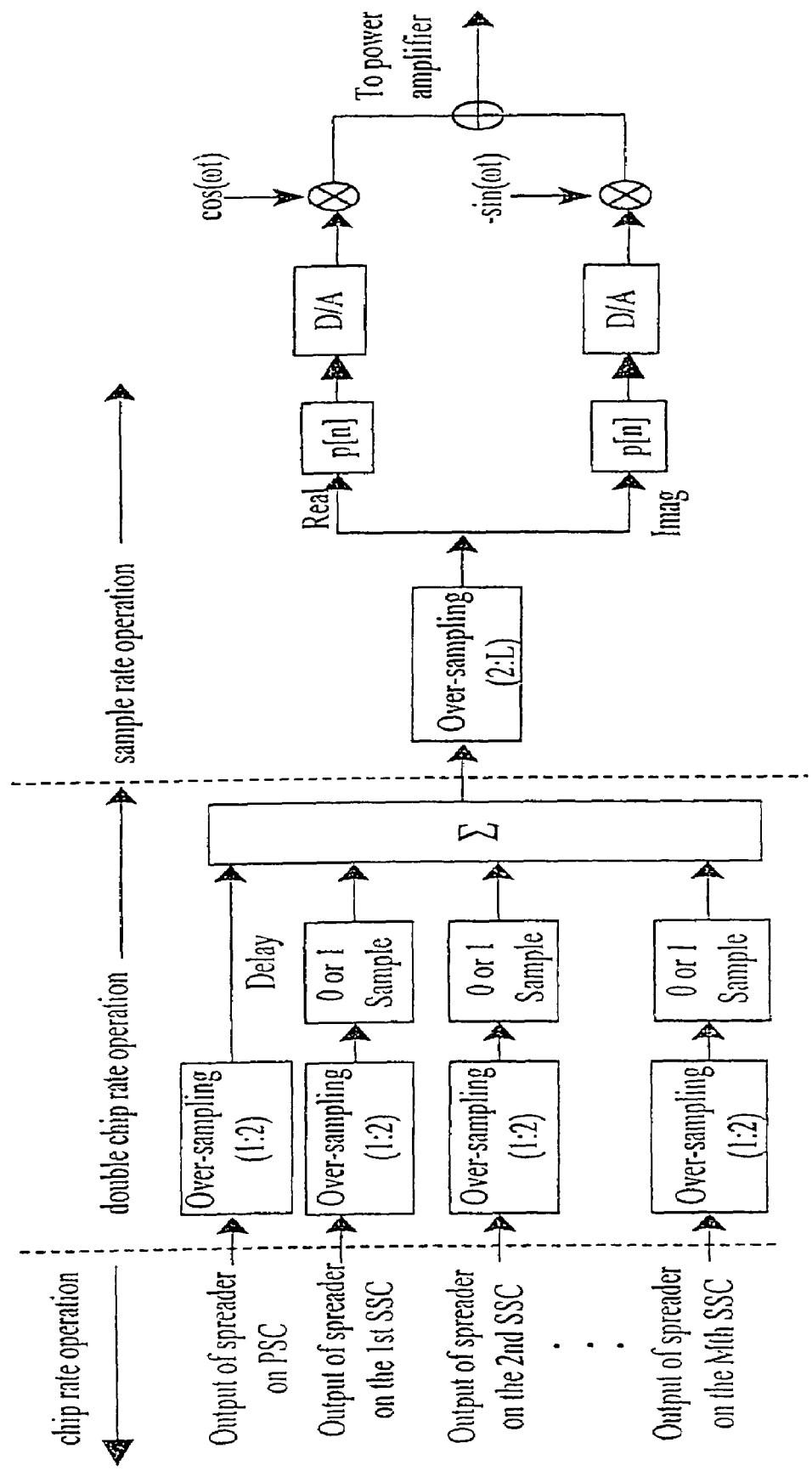
FIG. 14 is a block diagram illustrating the construction of a modulator in a base station transmitter in case that two starting points of chip transmission are used (N=2) according to the present invention.
Figure 15:
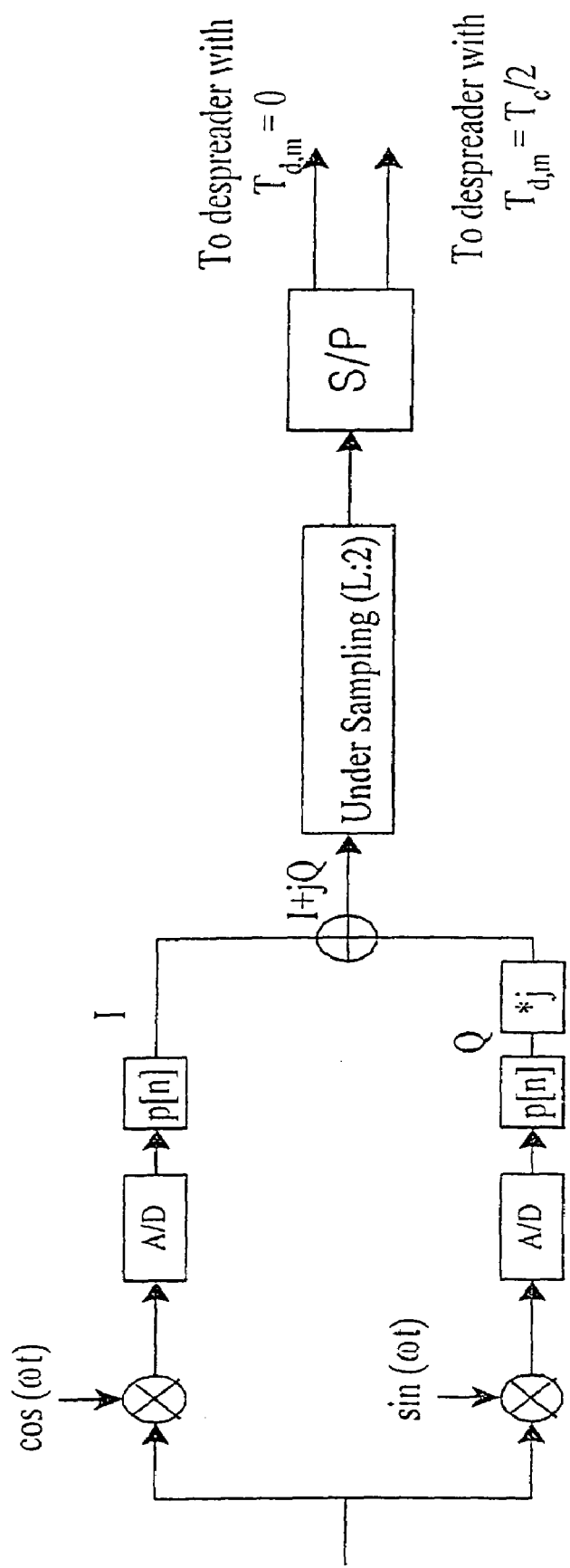
FIG. 15 is a block diagram illustrating the construction of a demodulator in a mobile station receiver in case that two starting points of chip transmission are used (N=2) according to the present invention.

FIG. 14 shows the construction of the modulator in the base station transmitter in case of N=2 according to the present invention, and FIG. 15 shows the construction of the demodulator in the mobile station receiver in case of N=2 according to the present invention.

Figure 5:
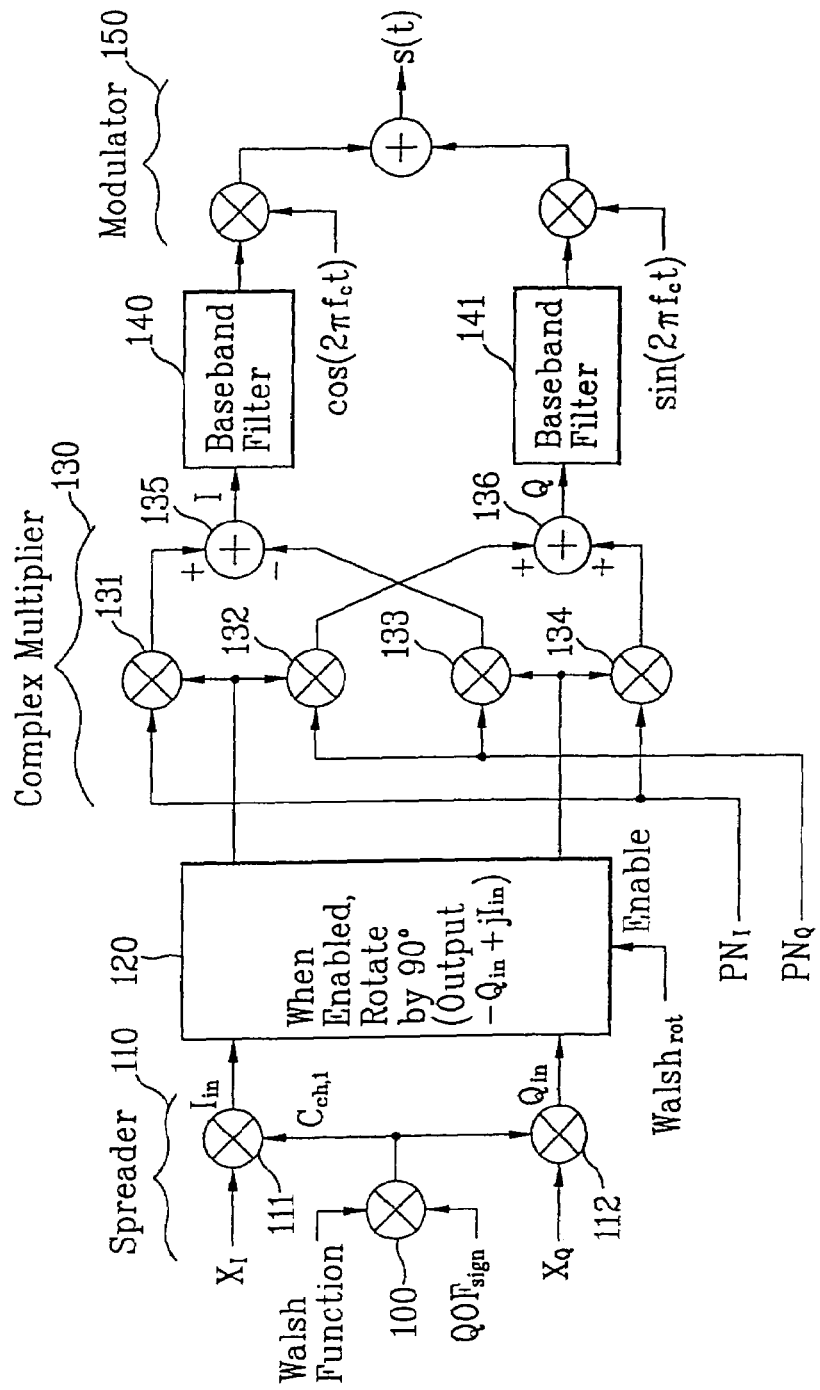
FIG. 5 is a block diagram of a base station transmitting device of a conventional cdma2000 system.
Figure 6:
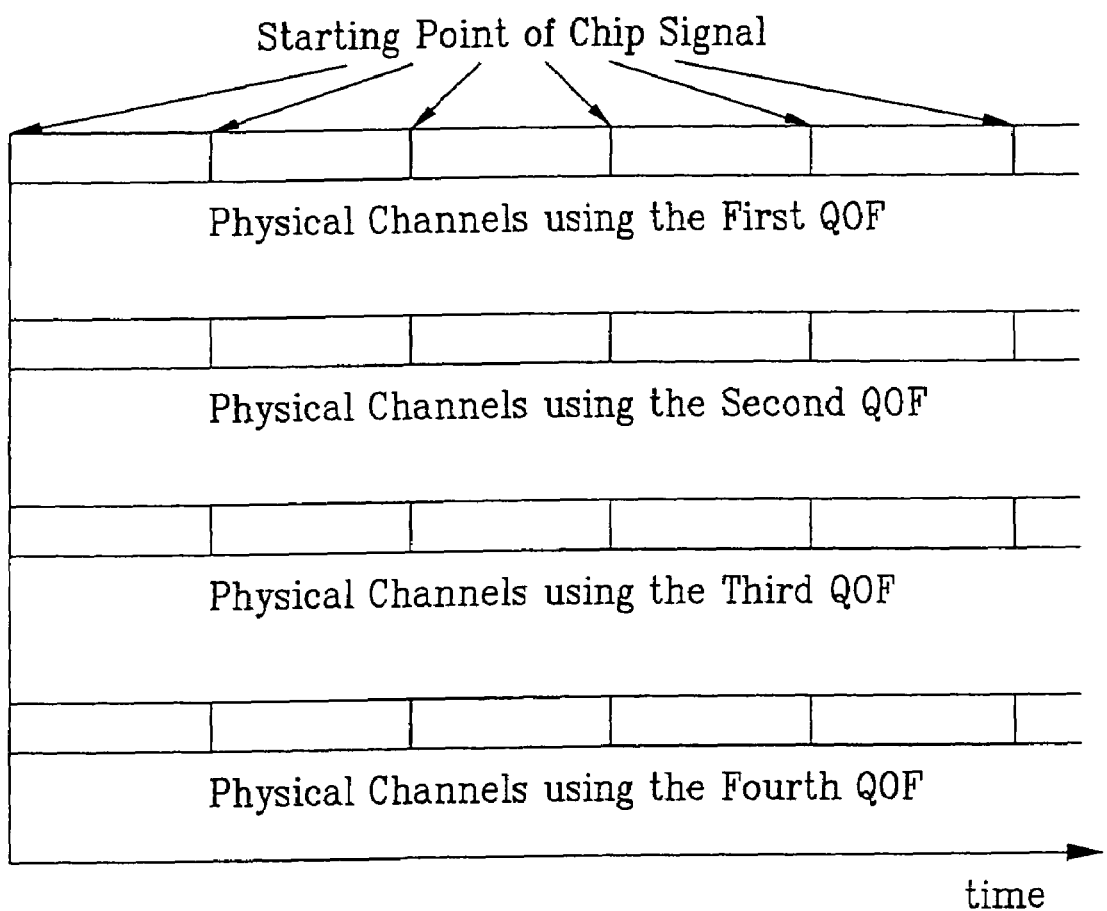
FIG. 6 is a view illustrating the difference among the starting points of chip transmission of the respective physical channels in a base station transmitting device of a conventional cdma2000 system.

Referring to FIG. 14, in the modulator of the base station transmitter in case of N=2 according to the present invention, the time delay of FIG. 5 is implemented by an oversampling block and a delay of "0" sample or "1" sample. Referring to FIG. 15, in case of N=12, the demodulator of the mobile station receiver according to the present invention outputs twice for one chip duration through the undersampling block. The output value of the demodulator is inputted to a serial-parallel converter, and two outputs of the serial-parallel converter are inputted to a descrambling block corresponding to the chip transmission starting point of "0" and a descrambling block corresponding to the chip transmission starting point of the half chip.

The construction and operation of one embodiment of the present invention in case of the cdma2000 system will be explained with reference to the accompanying drawings.

Figure 16:
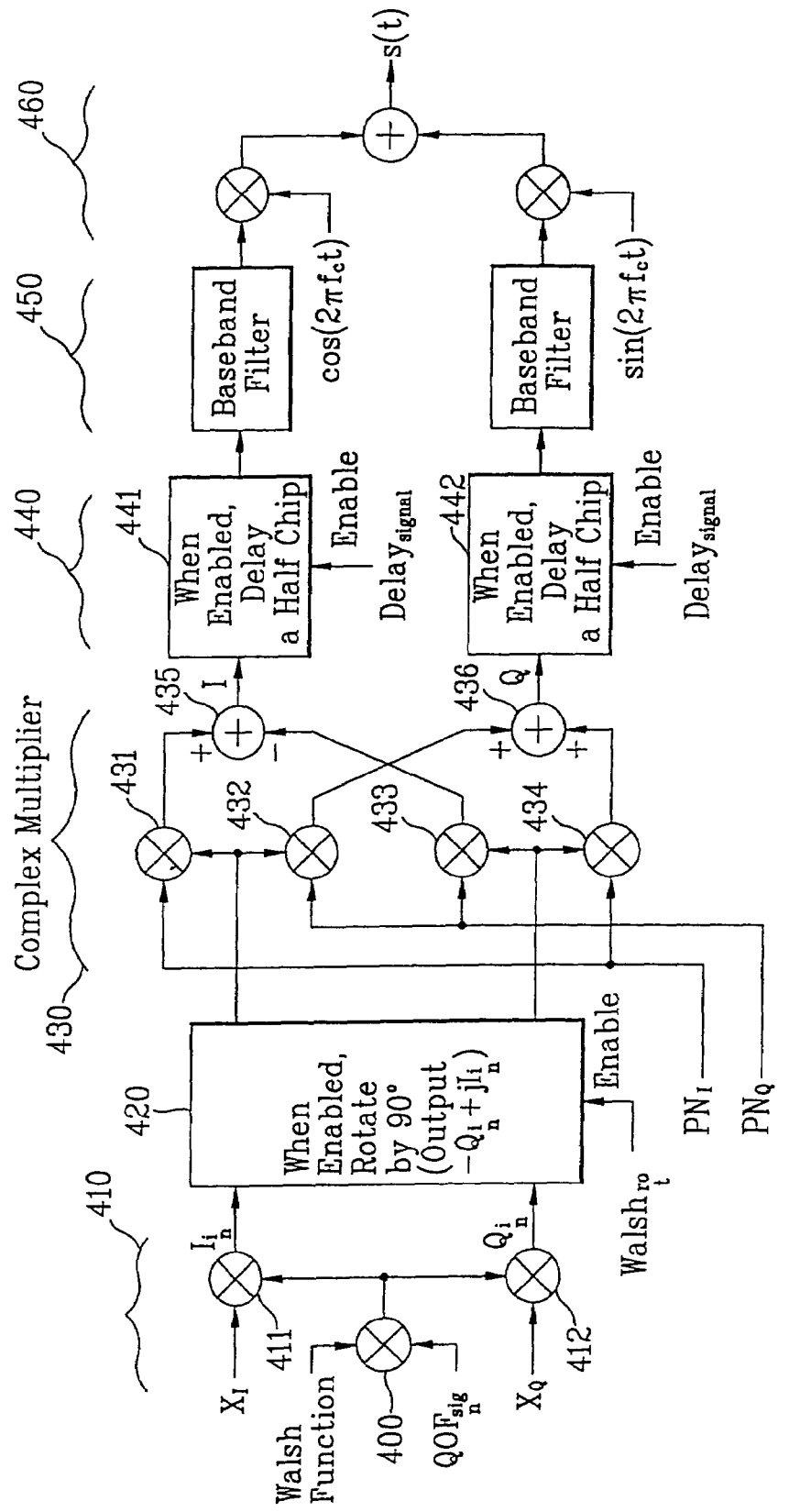
FIG. 16 in a block diagram of a transmitting device of the cdma2000 system according to the present invention.

FIG. 16 is a block diagram of the transmitting device of the cdma2000 system according to the present invention. FIG. 16 shows the transmitting device of the base station in the cdma2000 system.

Referring to FIG. 16, the transmitting device comprises a first mixer 400 for generating a channelization code by multiplying a Walsh function by a sign of a quasi-orthogonal function, a spreader 410 for spreading an input I-channel signal and Q-channel signal by multiplying them by the channelization code, a rotator 420 for rotating the spread I-channel signal and Q-channel signal on an I plane and a Q plane, respectively, in accordance with a Walsh rotation value, a complex multiplier 430 for complex-multiplying the I-channel signal and the Q-channel signal outputted from the rotator 420 by multiplying the I-channel signal and the Q-channel signal by a pseudo noise code, a delay section 440 for delaying starting points of chip transmission of the I-channel signal and the Q-channel signal in accordance with the index of the used quasi-orthogonal function, a baseband filter section 450 for filtering the delayed I-channel signal and Q-channel signal, and a modulator 460 for modulating the filtered I-channel signal and the Q-channel signal by multiplying the I-channel signal and the Q-channel signal by a carrier.

Here, the spreader 410 comprises a second mixer 411 for spreading the I-channel signal by multiplying the I-channel signal by the generated channelization code, and a third mixer 412 for spreading the Q-channel signal by multiplying the Q-channel signal by the generated channelization code.

The complex multiplier 430 comprises a fourth mixer 431 for multiplying the I-channel signal outputted from the rotator 420 by the pseudo random code of the I channel, a fifth mixer 432 for multiplying the I-channel signal outputted from the rotator 420 by the pseudo random code of the Q channel, a sixth mixer 433 for multiplying the Q-channel signal outputted from the rotator 420 by the pseudo random code of the I channel, a seventh mixer 434 for multiplying the Q-channel signal outputted from the rotator 420 by the pseudo random code of the I channel, a first combiner 435 for summing an output signal of the fourth mixer 431 and an output signal of the sixth mixer 433, and a second combiner 436 for summing an output signal of the fifth mixer 432 and an output signal of the seventh mixer 434.

The delay section 440 comprises a first delay 441 for delaying for a predetermined chip duration the I-channel signal outputted from a first summer 435 according to the index of the used pseudo-orthogonal function, and a second summer 442 for delaying for a predetermined chip duration the Q-channel signal outputted from a second summer 436 according to the used pseudo-orthogonal function.

The operation of the transmitting device of the cdma2000 system as constructed above will new be explained.

According to the transmitting device according to the present invention, the orthogonal physical channels transmit the chip signals with the same starting point of chip transmission, and the non-orthogonal physical channels transmit the chip signals with different starting points of chip transmission.

The present invention can achieve the reduction of interference if the interference occurs due to the non-orthogonality among the physical channels transmitted at the same time through the same frequency band. In the embodiment of the present invention, the physical channels having different quasi-orthogonal function (QOF) in the cdma2000 system is exemplified.

However, the physical channels may be different, and the scope of the present invention covers the physical channels transmitted at the same time through the same frequency band.

Inventions for transmitting the chip signals with different starting points of chip transmission through the physical channels having different scrambling codes in the W-CDMA system have already been filed (Refer to Application Nos. PP-32024 and P99-34205).

The difference between the present invention and the previously filed inventions is that in the cdma2000 system, no interference occurs due to the orthogonality among the physical channels in case of using the same quasi-orthogonal function (QOF), while in case of using different quasi-orthogonal functions (QOF), the interference occurred due to the non-orthogonality among the physical channels is reduced by differently determining the starting points of chip transmission of the physical channels in accordance with the index of the quasi-orthogonal functions (QOF) used in the physical channels. On the contrary, in the W-CDMA system, no interference occurs due to the orthogonality among the physical channels in case of using the same scrambling code, while in case of using different scrambling codes, the interference occurred due to the non-orthogonality among the physical channels is reduced by differently determining the starting points of chip transmission of the physical channels in accordance with the scrambling codes used in the physical channels.

Also, both in the W-CDMA system and the cdma2000 system, the value of the starting point of chip transmission is determined to be "0" or a halt chip.

This is derived by the previously filed inventions in case that the baseband filter has a root-raised cosine function, and is also applied to the baseband filter used in the cdma2000 system.

The size of interference between two non-orthogonal physical channels when the baseband filter is used in the cdma2000 system is shown in the following Table 5.

TABLE 5

| Chip transmission of two physical channels | Interference of two physical channels without non-orthogonal |
|---|---|
| 0 chip | 1 |
| ¼ chip | 0.96849 |
| ½ chip | 0.9371 |
| ¾ chip | 0.96849 |

As shown in Table 5, the size of the interference between two non-orthogonal physical channels becomes smallest in case that the difference between the starting points of chip transmission of the two physical channels is the half chip.

In case that three or more non-orthogonal physical channels exist, there is almost no difference in performance between making the starting points of chip transmission among the physical channels "0" or a half chip, and making the starting points of chip transmission "0", ¼ chip, □ chip, or ¾ chip.

The size of interference between various physical channels according to the minimum time period which the starting points of chip transmission can have is shown in the following Table 6.

TABLE 6

| | Total amount of interference among all physical channels according to value of chip transmission starting point | | |
|---|---|---|---|
| Non-orthogonal physical channel number | Zero chip | Zero chip or ½ chip | One chip, ¼ chip, ½ chip or ¾ chip |
| 2 | 2 | 1.8742 | 1.8742 |
| 3 | 6 | 5.7484 | 5.7486 |
| 4 | 12 | 11.4968 | 11.49632 |

Referring to Table 6, even if the values that the starting points of chip transmission can have are subdivided into "0" chip and a half chip, the reduction of the sum of interference affected among various non-orthogonal physical channels is insignificant. Also, as the vales that the starting points of chip transmission can have are subdivided, the complexity is increased.

Referring to Tables 5 and 6, it is preferable that the time period of the starting points of the chip transmission is determined to be "0" or a half chip.

Meanwhile, it is assumed that both the base station and the mobile station of the communications system already know the values of the starting points of chip transmission according to the index of the quasi-orthogonal function (QOF). The base station or the mobile station first matches the receiving time synchronization of the physical channels using the first QOF.

Thereafter, the base station or the mobile station matches the receiving time synchronization of the physical channels using the remaining QOFs using the difference among the starting points of chip transmission of the predetermined physical channels.

Accordingly, it is not required to operate the timing synchronization detecting circuit in order to find the receiving time synchronization of the respective QOFs.

The transmitting device of the base station as shown in FIG. 16 employs the delay section 440 for performing a half chip delay when an enable signal of the delay signal is inputted during the previous process of the baseband filter section 450. The enable state of the delay signal for the half chip delay can be determined in accordance with the index of the QOFs as shown in Table 6.

Figure 17:
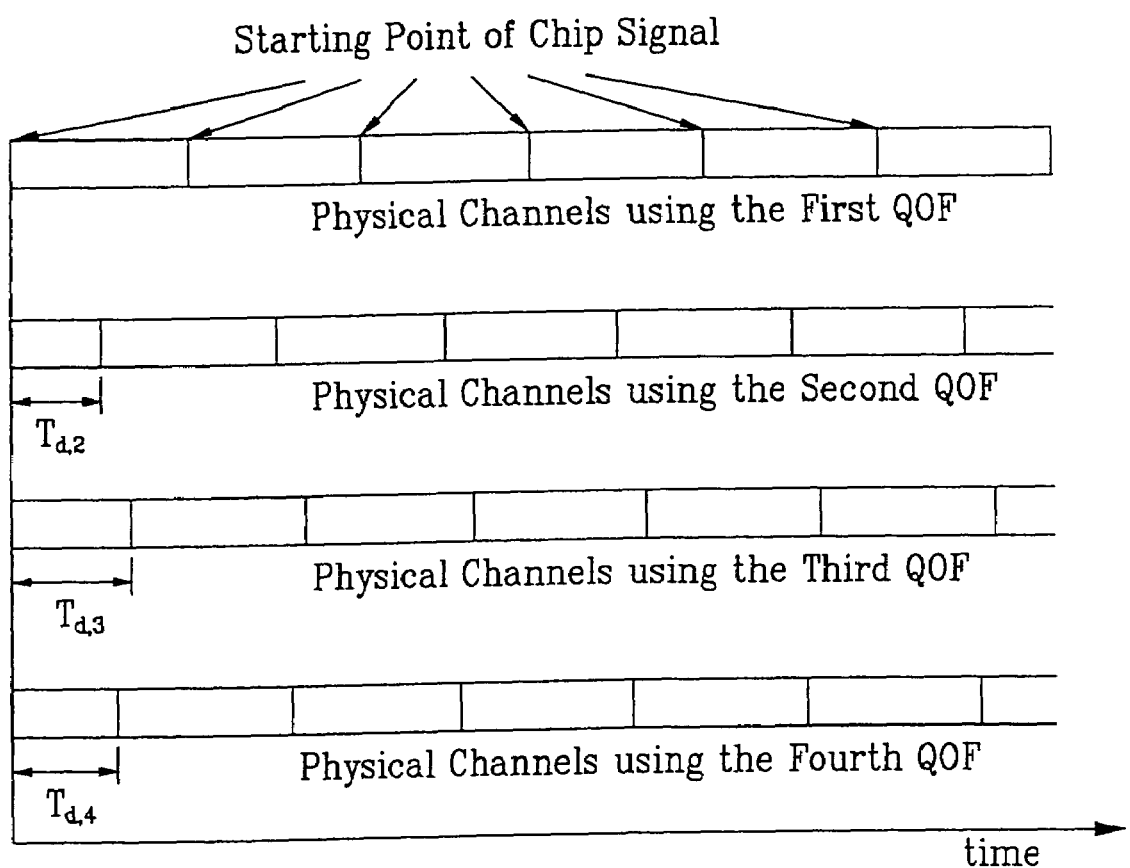
FIG. 17 is a view illustrating the starting points of chip transmission of the respective physical channels according to the present invention.

FIG. 17 is a view illustrating the starting points of chip transmission of the respective physical channels according to the present invention.

Referring to FIG. 17, the physical channels having the same index of the used QOFs transmit the chip signals with the same starting point of chip transmission, and the physical channels having the different indexes of the used QOFs transmit the chip signals with the different starting points of chip transmission.

Preferably, the time periods of the starting points of chip transmission are determined as the values which can minimize the interference with respect to the physical channels using the different QOFs. The starting points of chip transmission of the respective QOFs can also be determined for various environments such as the W-CDMA system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting physical channels, a downlink data transmits from a base station to at least a mobile station, the method comprising:
   determining a non-orthogonality among each downlink physical channel;
   differently deciding each transmission starting point of the each physical channel from the base station, if the non-orthogonality is determined to exist among the physical channels;
   transmitting the downlink data through the each physical channel having a different transmission starting point from the base station; and
   transmitting downlink data through other ones of the physical channels at a same transmission starting point if orthogonality exists among the other ones of the physical channels.

2. A method of transmitting physical channels, comprising:
   determining a non-orthogonality among each downlink physical channel through a same frequency bandwidth;
   differently deciding each transmission starting point of the each physical channel from a base station, if the non-orthogonality is determined to exist among the downlink physical channels;
   transmitting the downlink data through the each physical channel having the differently decided transmission starting points; and
   transmitting downlink data through other ones of the physical channels at a same transmission starting point if orthogonality exists among the other ones of the physical channels.

3. The method of claim 1, comprising:
   differently deciding, at a transmitter of the base station, chip transmission starting points of a plurality of physical channels using different scrambling codes with one another; and
   transmitting the downlink data through the physical channels at the differently decided chip transmission starting points.

4. The method of claim 3, wherein a time delay of the each transmission starting point decided differently with one another is determined by a value minimizing mutual interference to the plurality of physical channels scrambled with different scrambling codes.

5. The method of claim 4, wherein a time delay of the each chip transmission starting point minimizing mutual interference to the plurality of physical channels is a value equaling a power strength of the each downlink data transmitted through the physical channel.

6. The method of claim 3, wherein the time delay of the each chip transmission starting points differently decided with one another is determined to be shorter than a chip duration.

7. The method of claim 6, wherein the chip duration is a reciprocal number of chip rate.

8. The method of claim 3, when the transmitter of the base station transmits the downlink data through a first physical channel using a scrambling code and a second physical channel using another scrambling code, each chip transmission starting point of the first and second physical channels have a time interval corresponding to a half of the chip duration.

9. The method of claim 3, wherein a time delay of the each chip transmission starting points differently decided with one another is determined by a reciprocal number value of the number of the physical channels scrambled with different scrambling codes.

10. A method of transmitting data on downlink physical channels, from a base station to at least a mobile station, wherein the physical channels are distinguished from one another by specific codes, the method comprising:
examining whether the specific codes are orthogonal with one another;
determining starting times of transmitting data on the downlink physical channels, when the specific codes of the physical channels are non-orthogonal with one another, wherein the starting time of one physical channel from the base station is different from the starting time of another physical channel from the base station;
transmitting the data on the downlink physical channels at the determined starting times; and
transmitting data on other ones of downlink physical channels at a same starting time if orthogonality exists among the other ones of the downlink physical channels.

11. The method of claim 10, wherein the physical channels are transmitted with same frequency bandwidth.

12. The method of claim 10, wherein the specific codes are scrambling codes, and the starting time of transmission is the starting point of chip transmission.

13. The method of claim 12, wherein a time interval between chip transmission starting points is a value minimizing mutual interference between the physical channels.

14. The method of claim 12, wherein a time interval of the each chip transmission starting points is shorter than a chip duration.

15. The method of claim 14, wherein the time interval corresponds to a half of the chip duration.

16. The method of claim 12, wherein a time interval is determined by a reciprocal of the number of the physical channels scrambled with different scrambling codes.

17. A method of transmitting data on downlink physical channels, from a base station to at least a mobile station, wherein the physical channels are distinguished from one another by quasi-orthogonal functions, the method comprising:
examining indices of the quasi-orthogonal functions for each physical channel;
determining starting times of transmitting data on the downlink physical channels, when indices indicate that the quasi-orthogonal functions are non-orthogonal with one another, wherein the starting time of one physical channel from the base station is different from the starting time of another physical channel from the base station;
transmitting the data on the downlink physical channels at the determined starting times; and
transmitting data on other ones of the downlink physical channels at a same starting time when indices indicate that the other ones of the downlink physical channels are orthogonal with respect to each other.

18. The method of claim 17, wherein the starting time of transmission is the starting point of chip transmission.

19. The method of claim 17, wherein transmitting the data synchronized with time intervals between chip transmission starting points.

20. A method of transmitting data on physical channels using at least one scrambling code in a base station, comprising:
scrambling and transmitting first data on a first physical channel from the base station by a first scrambling code;
scrambling and transmitting second data on a second physical channel from the base station by a second scrambling code;
scrambling and transmitting third data on a third physical channel from the base station by a third scrambling code; and
wherein a chip synchronization on the first physical channel and on the second physical channel is not made, and chip synchronizing occurs between the second physical channel and the third physical channel.

21. The method of claim 20, wherein the first scrambling code and the second scrambling code have non-orthogonality with each other.

22. The method of claim 20, wherein a transmission offset between the physical channels is determined based on a number of the scrambling codes.

23. The method of claim 20, wherein a time interval between data transmission starting points is a value minimizing mutual interference between the physical channels.

24. The method of claim 20, wherein a time interval of data transmission starting points is shorter than a chip duration.

* * * * *